US012226776B2

(12) United States Patent
Sanchez-Martinez et al.

(10) Patent No.: US 12,226,776 B2
(45) Date of Patent: Feb. 18, 2025

(54) PREPARING SUBSTANCES IN A MEDICAL DIAGNOSTIC SYSTEM

(71) Applicant: Instrumentation Laboratory Company, Bedford, MA (US)

(72) Inventors: Demetrio Sanchez-Martinez, Bedford, MA (US); Joshua Shreve, Bedford, MA (US)

(73) Assignee: Instrumentation Laboratory Company, Bedford, MA (US)

( * ) Notice: Subject to any disclaimer, the term of this patent is extended or adjusted under 35 U.S.C. 154(b) by 203 days.

(21) Appl. No.: 17/519,351

(22) Filed: Nov. 4, 2021

(65) Prior Publication Data
US 2023/0139694 A1    May 4, 2023

(51) Int. Cl.
*B01L 3/00* (2006.01)
*G01N 1/28* (2006.01)

(52) U.S. Cl.
CPC .......... *B01L 3/50825* (2013.01); *G01N 1/286* (2013.01); *B01L 2200/0689* (2013.01); *B01L 2200/146* (2013.01); *B01L 2300/042* (2013.01); *B01L 2300/044* (2013.01); *B01L 2300/048* (2013.01); *B01L 2300/0832* (2013.01); *B01L 2400/0487* (2013.01); *G01N 2001/2866* (2013.01)

(58) Field of Classification Search
CPC ............ G01N 1/286; G01N 2001/2866; B01L 2200/0689; B01L 2200/146; B01L 2300/042; B01L 2300/044; B01L 2300/048; B01L 2300/0832; B01L 2400/0487
See application file for complete search history.

(56) References Cited

U.S. PATENT DOCUMENTS 5,380,486 A    1/1995    Anami
5,918,291 A    6/1999    Inacu et al.
(Continued)

FOREIGN PATENT DOCUMENTS

CN    2815956 Y    9/2006
CN    201001860 Y    1/2008
(Continued)

OTHER PUBLICATIONS

Extended European Search Report in Application No. 22182929.1 dated May 3, 2023 (15 pages).
(Continued)

*Primary Examiner* — Jill A Warden
*Assistant Examiner* — Alex Ramirez
(74) *Attorney, Agent, or Firm* — ArentFox Schiff LLP

(57) ABSTRACT

Operations performed according to the example techniques described herein include controlling a probe to pierce a stopper of a container containing a substance, where the stopper provides an air-tight seal for the container, and where the air-tight seal supports an internal pressure in the container. The operations also include detecting the internal pressure based on information from a pressure sensor; determining that the internal pressure is not at a target pressure and, based on determining that the internal pressure is not at the target pressure, controlling the probe either to aspirate air from the container or to dispense air into the container in order to move the internal pressure toward the target pressure.

18 Claims, 16 Drawing Sheets

(56) References Cited

U.S. PATENT DOCUMENTS

| | | | |
|---|---|---|---|
| 5,993,744 A | 11/1999 | Rao et al. | |
| 6,983,636 B2 | 1/2006 | Johnson et al. | |
| 7,032,631 B2 | 4/2006 | Py | |
| 7,128,105 B2 | 10/2006 | Tribble et al. | |
| 7,198,956 B2 | 4/2007 | Uffenheimer et al. | |
| 7,250,303 B2 | 7/2007 | Jakubowicz et al. | |
| 7,413,710 B2 | 8/2008 | Lisec et al. | |
| 7,469,606 B1 * | 12/2008 | Wiederin | G01N 35/109 73/864.24 |
| 7,618,409 B2 | 11/2009 | Hochman | |
| 7,685,893 B2 | 3/2010 | Champseix et al. | |
| 7,700,046 B2 | 4/2010 | Goldenberg | |
| 7,771,662 B2 | 8/2010 | Pressman et al. | |
| 7,883,499 B2 | 2/2011 | Fangrow | |
| 7,998,751 B2 | 8/2011 | Evers et al. | |
| 8,007,880 B2 | 8/2011 | Ullmann | |
| 8,012,766 B2 | 9/2011 | Graham | |
| 8,029,747 B2 | 10/2011 | Helmerson | |
| 8,088,593 B2 | 1/2012 | Burd et al. | |
| 8,088,616 B2 | 1/2012 | Handique | |
| 8,197,439 B2 | 6/2012 | Wang et al. | |
| 8,222,048 B2 | 7/2012 | Fritchie et al. | |
| 8,225,824 B2 | 7/2012 | Eliuk et al. | |
| 8,307,722 B2 | 11/2012 | Tajima et al. | |
| 8,323,984 B2 | 12/2012 | Betancourt et al. | |
| 8,333,936 B2 | 12/2012 | Miyashita et al. | |
| 8,336,403 B2 | 12/2012 | Tajima | |
| 8,357,544 B2 | 1/2013 | Ingenhoven et al. | |
| 8,361,021 B2 | 1/2013 | Wang et al. | |
| 8,389,272 B2 | 3/2013 | Linder et al. | |
| 8,431,077 B2 | 4/2013 | Goncalves | |
| 8,435,464 B2 | 5/2013 | Zuppiger | |
| 8,465,707 B2 | 6/2013 | Curran et al. | |
| 8,486,714 B2 | 7/2013 | Favuzzi et al. | |
| 8,578,798 B2 | 11/2013 | Pfauch et al. | |
| 8,636,041 B2 | 1/2014 | Yodfat | |
| 8,900,878 B2 | 12/2014 | Haack et al. | |
| 8,940,539 B2 | 1/2015 | Pearcy et al. | |
| 8,951,470 B2 | 2/2015 | Oonuma | |
| 8,969,098 B2 | 3/2015 | Kaminski | |
| 8,974,750 B2 | 3/2015 | Que et al. | |
| 9,080,681 B2 | 7/2015 | Weibel | |
| 9,132,062 B2 | 9/2015 | Fangrow | |
| 9,162,228 B2 | 10/2015 | Knight | |
| 9,415,386 B2 | 8/2016 | Schoeneck et al. | |
| 9,480,801 B2 | 11/2016 | Schiller et al. | |
| 9,488,555 B2 | 11/2016 | Carter, Jr. et al. | |
| 9,500,665 B2 | 11/2016 | Fukuda et al. | |
| 9,513,197 B2 | 12/2016 | Black | |
| 9,629,780 B2 | 4/2017 | Uber, III et al. | |
| 9,734,420 B2 | 8/2017 | Matthias et al. | |
| 9,750,953 B2 | 9/2017 | Kalafut | |
| 9,752,916 B2 | 9/2017 | Heinonen et al. | |
| 9,770,388 B2 | 9/2017 | Koike et al. | |
| 9,840,343 B2 | 12/2017 | Tachibana et al. | |
| 9,869,686 B2 | 1/2018 | Mori et al. | |
| 9,878,322 B2 | 1/2018 | Hutter et al. | |
| 9,910,054 B2 | 3/2018 | Johns | |
| 9,915,674 B2 | 3/2018 | Zordan | |
| 9,927,453 B2 | 3/2018 | Hirano et al. | |
| 9,943,651 B2 | 4/2018 | Deutsch | |
| 10,040,060 B2 | 8/2018 | Kressirer et al. | |
| 10,156,555 B2 | 12/2018 | Falkenstein | |
| 10,181,186 B2 | 1/2019 | Kriheli et al. | |
| 10,201,660 B2 | 2/2019 | Weikart et al. | |
| 10,228,382 B2 | 3/2019 | Dockrill et al. | |
| 10,537,675 B2 | 1/2020 | Cowan | |
| 10,625,260 B2 | 4/2020 | Drews et al. | |
| 10,702,864 B2 | 7/2020 | Kishimoto et al. | |
| 10,725,062 B2 | 7/2020 | Hamasaki et al. | |
| 10,802,034 B2 | 10/2020 | Gebauer et al. | |
| 10,830,784 B2 | 11/2020 | Whitacre et al. | |
| 10,837,978 B2 | 11/2020 | Iwashita et al. | |
| 10,850,873 B2 | 12/2020 | Procyshyn et al. | |
| 10,955,390 B2 | 3/2021 | Minato et al. | |
| 11,016,008 B2 | 5/2021 | Drews et al. | |
| 2004/0149015 A1 | 8/2004 | Hansen et al. | |
| 2006/0002824 A1 | 1/2006 | Chang et al. | |
| 2011/0104810 A1 | 5/2011 | Shiba et al. | |
| 2012/0103468 A1 | 5/2012 | Terwilliger et al. | |
| 2013/0064738 A1 | 3/2013 | Berger et al. | |
| 2015/0211950 A1 | 7/2015 | Eckhoff et al. | |
| 2016/0341756 A1 * | 11/2016 | Hirano | B01L 3/021 |
| 2018/0299476 A1 | 10/2018 | Kircanski et al. | |
| 2019/0077022 A1 | 3/2019 | Murakami et al. | |
| 2019/0170782 A1 | 6/2019 | Nishio | |
| 2019/0242921 A1 | 8/2019 | Drechsler et al. | |
| 2020/0011770 A1 | 1/2020 | Wang et al. | |
| 2020/0158744 A1 | 5/2020 | Schöndube et al. | |
| 2020/0020670 A1 | 7/2020 | Aldecoa | |
| 2020/0206703 A1 | 7/2020 | Anitua Aldecoa | |
| 2020/0330327 A1 | 10/2020 | Naftalovitz | |
| 2020/0330977 A1 | 10/2020 | Wikholm et al. | |
| 2020/0348325 A1 | 11/2020 | Mori et al. | |
| 2021/0170390 A1 | 6/2021 | Egli et al. | |
| 2021/0308665 A1 * | 10/2021 | Farr | G01N 1/2813 |

FOREIGN PATENT DOCUMENTS

| | | |
|---|---|---|
| CN | 103557984 B | 10/2015 |
| CN | 106345005 A | 1/2017 |
| CN | 106596992 A | 4/2017 |
| CN | 104436354 B | 7/2017 |
| CN | 107198658 A | 9/2017 |
| CN | 207379580 U | 5/2018 |
| CN | 106353522 B | 6/2018 |
| CN | 106215991 B | 12/2018 |
| CN | 107796950 A | 9/2019 |
| CN | 209451064 U | 10/2019 |
| CN | 110538073 A | 12/2019 |
| CN | 112108198 A | 12/2020 |
| CN | 112156267 A | 1/2021 |
| CN | 112403546 A | 2/2021 |
| CN | 107997961 B | 6/2021 |
| EP | 1193212 B1 | 5/2003 |
| EP | 1391734 B1 | 4/2013 |
| EP | 1594749 B1 | 5/2013 |
| EP | 3021814 A2 | 5/2016 |
| EP | 3079823 B1 | 11/2018 |
| EP | 3410121 A1 | 12/2018 |
| EP | 3573758 A1 | 12/2019 |
| EP | 3362183 B1 | 7/2021 |
| EP | 3858971 A1 | 8/2021 |
| FR | 2862756 A1 | 5/2005 |
| GB | 2526844 A | 12/2015 |
| GB | 2588635 A | 5/2021 |
| JP | S56-162057 U1 | 12/1981 |
| JP | S56162057 U | 12/1981 |
| JP | 2008128662 A | 6/2008 |
| JP | 2009174911 | 8/2009 |
| JP | 2009174911 A | 8/2009 |
| JP | 2010071765 A | 4/2010 |
| JP | 6057754 B2 | 1/2017 |
| JP | 6567890 B2 | 8/2019 |
| JP | 6717293 B2 | 7/2020 |
| JP | 20211081387 A | 5/2021 |
| KR | 20140012579 A | 2/2014 |
| KR | 101863355 B1 | 6/2018 |
| KR | 101992612 B1 | 6/2019 |
| KR | 102257845 B1 | 5/2021 |
| WO | 2004104584 A1 | 7/2006 |
| WO | 2007129741 A1 | 11/2007 |
| WO | 2015155229 A1 | 10/2015 |
| WO | 2017006477 A1 | 1/2017 |
| WO | 2021014848 A1 | 1/2021 |
| WO | 2021111725 A1 | 6/2021 |
| WO | 2021189883 A1 | 9/2021 |
| WO | 2020170751 A1 | 10/2021 |

OTHER PUBLICATIONS

Partial European Search Report (R. 64 EPC) for European Patent Application No. 22182929.4, mailed Jan. 9, 2023, (13 pages).

(56) References Cited

OTHER PUBLICATIONS

Examination Report No. 1 for Australian Application No. 2022228211 dated Aug. 10, 2023, 4 pages.
Machine Translation of Japanese Publication No. JPS56-162057.
US9927453B2, Claims 1 and 4; Figures 2 and 6 and accompanying text.
US9878322B2, Claim 1; Figure 1 and accompanying text.
US9770388B2, Claims 1 and 18; Figure 3 and accompanying text.
US9734420B2, Claims 1, 12, 17, 28, and 33; Figures 2, 3a, 3b, and 3c and accompanying text.
US9500665B2, Claims 1 and 13; Figure 7 and accompanying text.
US8969098B2, Claims 1 and 15; Figures 3, 5, and 8 and accompanying text.
US8951470B2, Claims 1, 2, 3 and 5; Figures 7A and 7B and accompanying text.
US8940539B2, Claims 1, 5, and 21; Figure 23B and accompanying text.
US8486714B2, Claims 1, 7, and 26; Figure 8 and accompanying text.
US8465707B2, Claims 1 and 15; Figure 4D and accompanying text.
US8431077B2, Claim 1; Figure 1 and accompanying text.
US8389272B2, Claims 1, 2, and 3; Figure 12 and accompanying text.
US8357544B2, Claims 1 and 6; Figure 1 and accompanying text.
US8323984B2, Claims 1 and 3; Figures 2 and 4 and accompanying text.
US8225824B2, Claims 1 and 9; Figures 6B and 7 and accompanying text.
US8029747B2, Claim 1; Figure 2 and accompanying text.
US7198956B2, Claims 1, 4, 8, and 10; Figure 1 and accompanying text.
US7128105B2, Claims 1, 19, and 24; Figure 4 and accompanying text.
US6983636B2, Claims 1, 10, and 19; Figure 2 and accompanying text.
US11016008B2, Claims 1 and 10; Figures 2 and 11 and accompanying text.
US10955390B2, Claim 1; Figures 4 and 5 and accompanying text.
US10830784B2, Claim 1; Figures 2, 4, 7 and 12 and accompanying text.
US10802034B2, Claims 1, 12, 13, 17, and 18; Figure 6 and accompanying text.
US10625260B2, Claim 1; Figures 2 and 11 and accompanying text.
US10228382B2, Claims 1 and 13; Figure 12B and accompanying text.
US20200330327A1, Claims 1, 23, and 29; Figure 9B and accompanying text.
US20200330977A1, Claim 1; Figures 1 and 6 and accompanying text.
US20210170390A1, Claims 1 and 7; Figures 1, 2, and 4 and accompanying text.
US20210308665A1, Claims 1 and 29; Figures 4A and 4C and accompanying text.
CN110538073A, Claim 1; Figure 1 and accompanying text.
EP1391734B1, Claims 1 and 13; Figure 1 and accompanying text.
EP3021814A2, Claims 1, 6, 10, 23, 35, 42, 46, 49, and 51; Figure 8 and accompanying text.
EP3079823B1, Claims 1 and 9; Figure 1 and accompanying text.
GB2588635A, Claims 1, 9, 10, and 15; Figures 1, 2C and 2D and accompanying text.
JP2021081387A, Claims 1 and 6; Figures 5 and 7 and accompanying text.
JP6057754B2, Claims 1 and 4; Figure 1 and accompanying text.
JP6717293B2, Claims 1 and 8; Figure 4 and accompanying text.
WO2017006477A1, Claim 1; Figure 9 and accompanying text.
WO2021111725A1, Claims 1, 12, 14; Figure 9 and accompanying text.
Examination Report No. 2 for Australian Application No. 2022228211 dated Feb. 22, 2024, 3 pages.
Office Action received for European Patent Application No. 22182929.4, mailed on Oct. 29, 2024, 7 pages.

\* cited by examiner

PREPARING SUBSTANCES IN A MEDICAL DIAGNOSTIC SYSTEM

TECHNICAL FIELD

This specification relates generally to techniques for preparing substances for use in a medical diagnostic system.

BACKGROUND

A medical diagnostic system performs tests on a sample, such as blood or tissue, obtained from a patient. The tests performed by a medical diagnostic system are referred to as assays. An example assay is an investigative procedure for qualitatively assessing or quantitatively measuring the presence, amount, or functional activity of an analyte in the sample. One or more substances, such as reagents, controls, or calibrators, may be used by a medical diagnostic system to perform an assay on a sample.

SUMMARY

Example techniques may be implemented using a method, a system, or one or more non-transitory machine-readable media storing instructions that are executable by one or more processing devices. Operations performed according to the example techniques include controlling a probe to pierce a stopper of a container containing a substance, where the stopper provides an air-tight seal for the container, and where the air-tight seal supports an internal pressure in the container. The operations also include detecting the internal pressure based on information from a pressure sensor; determining that the internal pressure is not at a target pressure and, based on determining that the internal pressure is not at the target pressure, controlling the probe either to aspirate air from the container or to dispense air into the container in order to move the internal pressure toward the target pressure. The techniques may include one or more of the following features, either alone or in combination.

The following operations may be repeated until the internal pressure is within a predefined range of the target pressure: controlling the probe either to aspirate air from the container or to dispense air to the container. Determining that the internal pressure is not at a target pressure may include comparing the internal pressure to information based on the target pressure. The target pressure may be based on ambient pressure and the probe may be controllable to transfer content into the container. The internal pressure may be less than the target pressure prior to transfer of the content into the container. In this case, the probe may be controllable to dispense air into the container prior to transferring the content into the container in order to increase the internal pressure. The internal pressure may be greater than the target pressure following transfer of at least some of the content into the container. In this case, the probe may be controllable to aspirate air from the container after transferring the at least some of the content into the container in order to adjust the decrease the internal pressure.

Detecting the internal pressure may include receiving data from the pressure sensor connected to or part of or on the probe. Adjusting the internal pressure toward the target pressure may include maintaining a lower pressure in the container than ambient pressure. The probe may be controllable to dispense air multiple times into the container or to aspirate air from the container multiple times to bring the internal pressure closer to the target pressure. The multiple times may be a predefined number of times. The probe may be controllable based on an expansion of air inside the probe to aspirate additional content from the container.

An example probe is configured to aspirate or to dispense a substance. The probe includes a shaft to hold the substance and a hydraulic line that includes hydraulic fluid to create negative or positive pressure in the shaft to aspirate or to dispense the substance, respectively. The probe is controllable to aspirate air prior to aspirating the substance, thereby creating an air gap in the shaft between the hydraulic fluid and the substance. After aspirating the air, the probe is controllable to aspirate substance and air alternately, thereby creating at least one air gap between sections of substance contained in the shaft in addition to the air gap between the hydraulic fluid and the substance. The probe may include one or more of the following features, either alone or in combination.

The at least one air gap between sections of substance contained in the shaft may include at least two air gaps. Each of the at least two air gaps may be between two sections of substance, There may be at least between three and five air gaps in the shaft. The shaft may include metal and the hydraulic line may include non-metal resulting in an interface that may allow leakage of the hydraulic fluid into the shaft. The probe may be controllable to dispense substance from the shaft along with air on each side of the substance to be dispensed.

Example techniques may be implemented using a method, a system, or more non-transitory machine-readable media storing instructions that are executable by one or more processing devices. Operations performed according to the example techniques include controlling a probe to aspirate air into a shaft of the probe and controlling the probe to dispense air from the shaft into the container to mix at least the first substance and the second substance. The techniques may include one or more of the following features, either alone or in combination.

The container may include a vial, the first substance may include a reagent in a liquid or dried/lyophilized form, and the second substance may include a diluent. Dispensing the air from the shaft produces mixture in the vial that is based on the diluent and the reagent and that is at least partially homogenized. Prior to aspirating the air, the probe is controllable to aspirate the second substance into a shaft of the probe, to cause the shaft to enter the container containing the first substance, and to dispense the second substance into the container. The container may hold one or more additional substances in addition to the first substance and the second substance Mixing may include mixing the one or more additional substances with the first substance and the second substance, Either (i) the air is aspirated from inside the container or (ii) the air is aspirated form outside the container and, in (ii), the shaft is controlled to enter the container to dispense the air. The air may be dispensed at a velocity that homogenizes the mixture.

Any two or more of the features described in this specification, including in this summary section, can be combined to form implementations not specifically described herein.

The systems, techniques, components, structures, and variations thereof described herein, or portions thereof, can be implemented using, or controlled by, a computer program product that includes instructions that are stored on one or more non-transitory machine-readable storage media, and that are executable on one or more processing devices to execute at least some of the operations described herein. The systems, techniques, components, structures, and variations thereof described herein, or portions thereof, can be implemented as an apparatus, method, or electronic system that can include one or more processing devices and memory to store executable instructions to implement various operations. The systems, techniques, components, structures, and variations thereof described herein may be configured, for example, through design, construction, size, shape, arrangement, placement, programming, operation, activation, deactivation, and/or control.

The details of one or more implementations are set forth in the accompanying drawings and the description below. Other features, objects, and advantages will be apparent from the description and drawings, and from the claims.

DESCRIPTION OF THE DRAWINGS

Like reference numerals in different figures indicate like elements.

DETAILED DESCRIPTION

Figure 1:
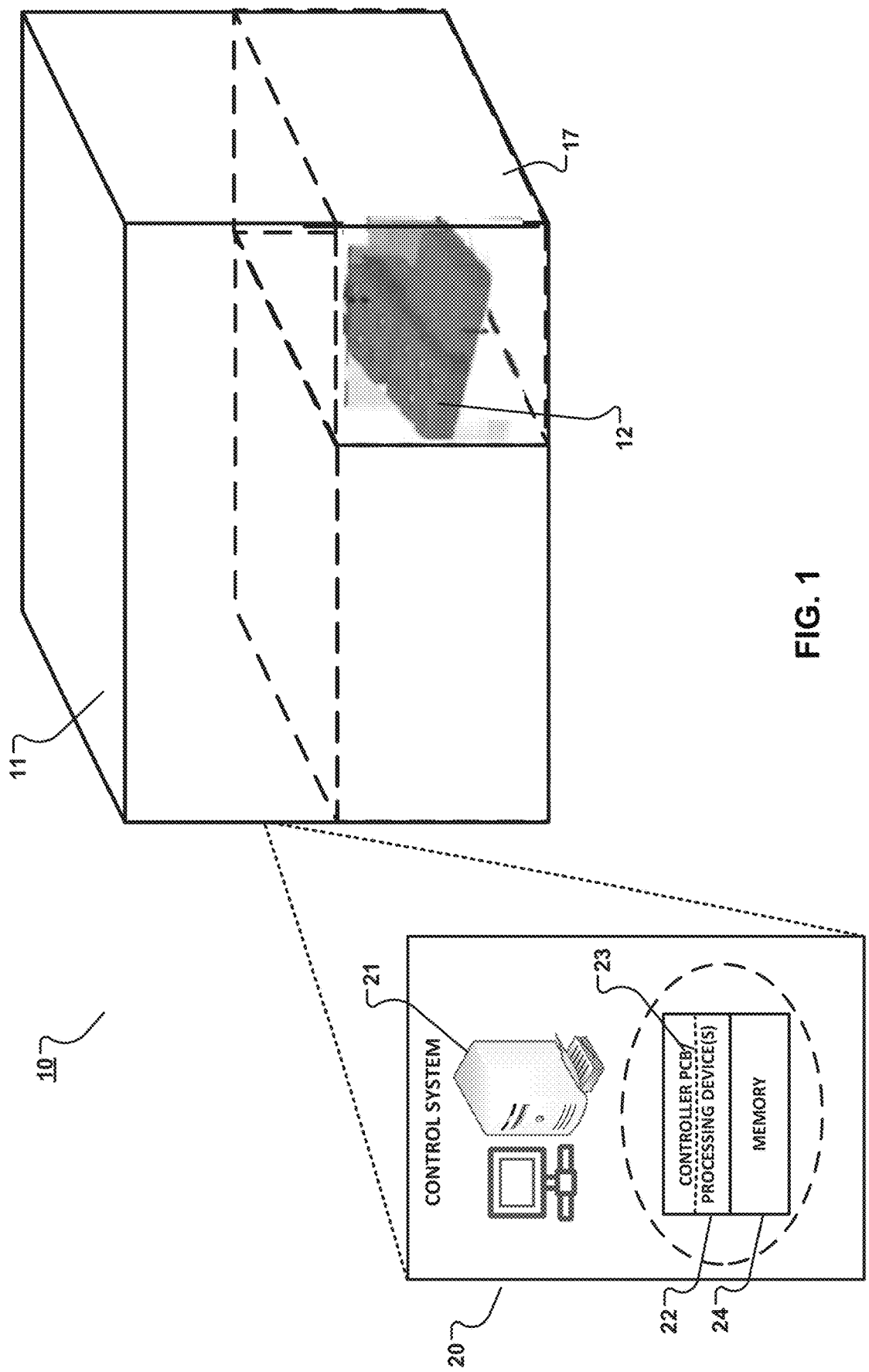
FIG. 1 is block diagram showing components of an example medical diagnostic system on which the example techniques described herein may be implemented.

Described herein are examples of medical diagnostic instruments, systems, and variants thereof (referred to collectively as "the system") that implement techniques for preparing substances for use in an assay. In this regard, the system may include test containers called vials. The vials may include any substance needed to implement an assay. Examples of substances that may be included in the vial include, but are not limited to, diluent and reagents. Examples of diluents that may be used include but are not limited to deionized (DI) water, buffers, and liquid mixture of different chemicals. Examples of reagents that may be used include, but are not limited to, simple and/or complex chemical mixtures.

When an assay needs to be prepared prior to running tests on the system, the substances in the assay are prepared inside the vials contained in a cartridge. In an example, a first one of the vials may contain a lyophilized substance or a liquid substance and a second one of the vials may contain diluent, such as DI water. To prepare the substances for use in an assay, a probe in the system may move diluent from the first vial into the second vial to mix the diluent and the substance. Example preparations include rehydrating a freeze-dried component (substance) or mixing together multiple components (substances) prior to use. Generally, substances in dry (e.g., lyophilized) form are stored in vials well below ambient pressure, for example, at or near vacuum. Substances in liquid form may be stored in the vials with a slightly positive internal pressure.

The pressure differential between the interior and exterior of a vial can cause problems during extraction of substance from a vial or dispensing in a vial. For example, if the pressure inside the second vial is well below ambient pressure—that is, considerably negative—this can result in suctioning unwanted substances into the vial from a probe (or needle) when a stopper of the vial is pierced. For example, if the pressure inside the vial is above ambient pressure—that is positive—this can result in substances erupting or leaking from the vial when its stopper is pierced.

Generally, prior to the vial's use, the system performs a pressure equilibration for the vial such that the vial's internal pressure can reach a target pressure. In some implementations, the pressure equilibration can be performed using a probe that is the same as the probe for aspiring substances from the vial or a different device, such as probe designated to perform the equilibration. A benefit of using the same probe may be a potential reduction in contamination, whereas a benefit of using a different device is that there may be additional flexibility in system design. The pressure equilibration can be implemented by aspirating air from the vial or dispensing air into the vial to adjust the internal pressure of the vial toward a target pressure.

In an example implementation, a probe is controlled to pierce a stopper of the vial, which provides an air-tight seal maintaining the internal, non-ambient pressure within the vial. A pressure sensor is connected to or part of or on the probe. The internal pressure of the vial is detected based on information from the pressure sensor connected to or part of or on the probe. The system determines that the internal pressure is not the target pressure or within an acceptable range thereof. Then, prior to moving any substance into or from the vial, the probe is controlled to aspirate air from the vial if the pressure is positive or to dispense air into the vial if the pressure is negative relative to the target pressure in order to move the internal pressure toward the target pressure.

Penetrating the vial to aspirate air from the vial or to dispense air into the vial may be performed multiple times—for example, a predefined number of times—prior to moving any substance into or from the vial and/or between transfers of substance into or from the vial in order to reach and/or to maintain a pressure in the vial at or near a target pressure. Other techniques for adjusting pressure are also described herein.

As noted, the probe used for pressure equilibration, referred to as an equilibration probe, can be the same as, or different from a probe that transports substances to or from the vials, referred to as a transport probe. In some implementations, any one or all of the probes described herein are hydraulic. For example, the transport probe may include a hydraulic line that holds hydraulic fluid, such as DI water. Flow of the hydraulic fluid is controllable to create a negative pressure or a positive pressure in its shaft in order, respectively, to aspirate a substance into the shaft or to dispense a substance from the shaft. The interface between the hydraulics and the remainder of the probe, including the shaft, may produce a hydraulic fluid to leak into the shaft. The leaked hydraulic fluid may contaminate a substance that has been aspirated into the shaft. For example, a substance aspirated into the shaft for movement from one vial into another vial (or another container, such as a cuvette) may be contaminated by the leaking hydraulic fluid. In this context, contamination may include diluting the substance with the hydraulic fluid.

To reduce such contamination and the deleterious effects thereof, the probe is controlled to create an air gap between the hydraulic fluid and the substance in the shaft and to create multiple sections of substance-air gaps in the shaft, with each layer of substance being separated from an adjacent layer of substance by an air gap. In the event of a hydraulic fluid leak, the multiple sections of substance and air reduce the amount of hydraulic fluid that reaches substances aspirated into the probe.

In some examples, a probe may contain a shaft having a lumen, such as a needle. To mix substances in the vial or cuvette, a probe, referred to as a mixing probe, may be controlled to aspirate air into its shaft. The mixing probe may be the same probe as the equilibration probe and/or the transport probe, or the mixing probe may be a different device. Advantages of using the same probe for equilibration, transport, and mixing may include, but are not limited to, efficiency and cost effectiveness without compromising performance and/or increasing contamination/carry over.

The mixing probe may be controlled so that its shaft pierces the vial's stopper and dispenses air from the shaft into the vial to mix the substances in the vial. The air may be forced into the vial at such velocity to promote or to ensure sufficient homogenization of the substances, or aspirate and dispense the liquid mixture enough times to ensure sufficient homogenization of the substances, e.g., in such way that the resulting analytical performance of the homogenized substances is equivalent to the standard assay, experimentally assessed based, for example, on previous experimentation. Other techniques for mixing the substances also described herein.

The devices for use in performing equilibration, transporting, and mixing may be devices other than probes, such as but not limited to robotic arms, so long as the devices perform the appropriate functions, such as mixing/homogenizing in such way that the analytical performance of the resulting homogenized substances is equivalent to the standard assay, as experimentally assessed. In the description below, any type of other device may be substituted for the probe.

FIG. 1 shows a block diagram of an example system 10 configured to implement the techniques described in the preceding paragraphs. The techniques described herein, however, are not limited to use a system such as that shown in FIG. 1. The system of FIG. 1 is provided as an example for illustration only.

Figure 10:
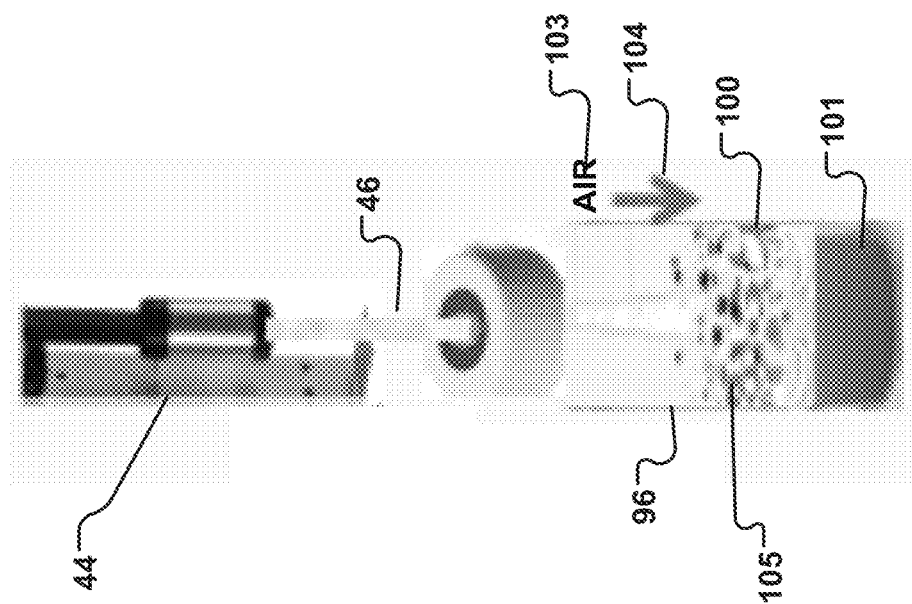
FIG. 10 is a perspective diagram that illustrates, conceptually, mixing substances in a vial using forced air as a mixing agent.
Figure 11:
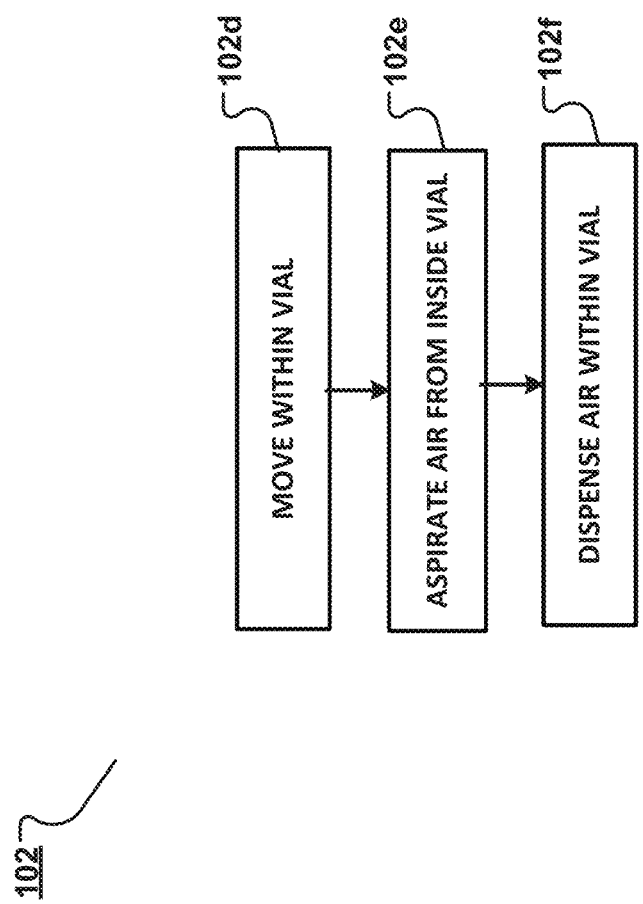
FIG. 11 is a flowchart showing an example process for mixing substances in a vial using forced air as a mixing agent.

System 10 includes a medical diagnostic instrument 11 for receiving and for holding test cartridges ("cartridges") 12. Each cartridge holds containers, such as the vials that contain the substances that are used in the assays described herein. The substances in the vials and/or the vials in the cartridges may be processed for use with a particular assay. Processing may include, but is not limited to, changing or equilibrating the internal pressure of vials in the system, transporting substances to and from the vials, and/or mixing substances at the transported location, e.g., in a vial or in a cuvette or another testing related container/chamber, prior to use in an assay. The processing may be performed using one or more controllable robotic probes ("probe") such as probe 30 in FIG. 2 or probe 44 of FIGS. 3 and 9. For example, the probe is controllable to move between and into the vials in order to implement all or some of the techniques described herein. The probe may be hydraulic, as described herein and, when transporting substances, may be controlled to create an air gap between the probe's hydraulic fluid and the substance in the probe's shaft and to create multiple layers of substance in the shaft, with each substance layer being separated from an adjacent substance layer by an air gap. Among other functions, as described below, the probe may also be used to mix/homogenize the substances in the vials by air injection (as in FIGS. 10 and 11) and/or by aspirating and dispensing the liquid substances in the vial (as in FIGS. 12 and 13). The mixing process starts when all necessary substances are in a container, as described in more detail below.

Control over system 10 may be implemented by a control system 20 embedded in, and/or associated with, instrument 11. In some implementations, components of the control system may be distributed across instrument 11 and/or one or more computing devices 21 in communication with instrument 11. The control system may be or include one or more processing devices 22, examples of which are described herein. The processing devices 22 may reside within instrument 11 or be external to instrument 11—for example externally local to, or remote from, instrument 11. In some implementations, processing devices 22 may reside within computing system 21. Computing system 21 may be separate from instrument 11 but may be connected to instrument 11 directly or via a wired or wireless computer network to enable communication between instrument 11 and computing system 21. In some implementations, control system 20 includes a controller printed circuit board (PCB) 23 having one or more of the processing devices 22 that are programmable to control operations of various system components. Controller PCB 23 may be embedded in instrument 11 or external to instrument 11. Control system 20 may also include machine-readable and writable memory 24, which may be internal and/or external to instrument 11, and which stores data and computer programs that are executable by one or more processing devices on the controller PCB and/or the computing system. The instrument has the ability to identify any of the contents that are loaded into the instrument and will execute equilibration, transport, and/or mixing instructions based on the substances included in the vials loaded into the instrument.

Figure 2:
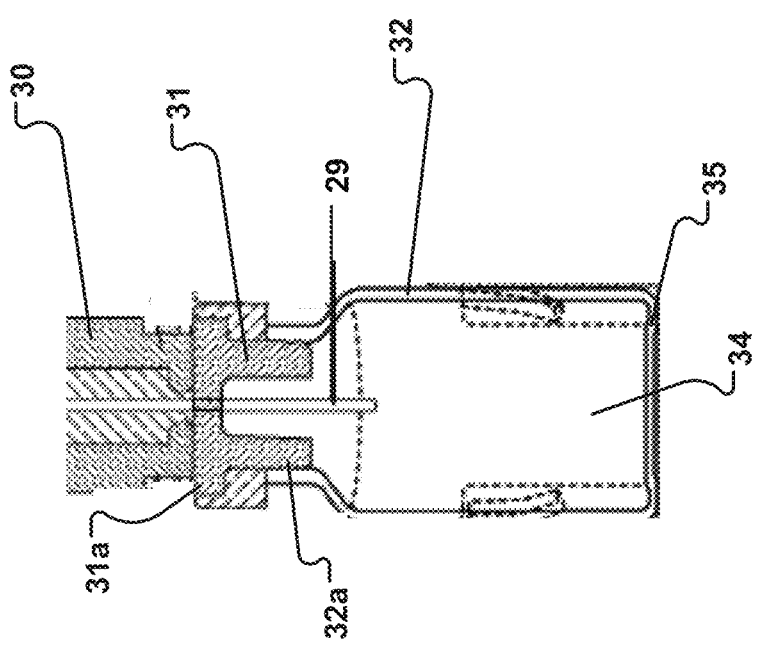
FIG. 2 is a cut-away side view of an example vial and part of a probe.

Referring to FIG. 2, the cover of example vial 32, referred to as a stopper above, creates an air-tight/fluid-tight seal with the vial. Within the vial, the unequilibrated pressure may be positive or negative relative to ambient pressure, as described herein. The stopper may be made of plastic, rubber, or other elastic material that can be pierced by the probe. FIG. 2 shows a probe shaft 29 piercing a stopper 31 of vial 32.

Figure 3:
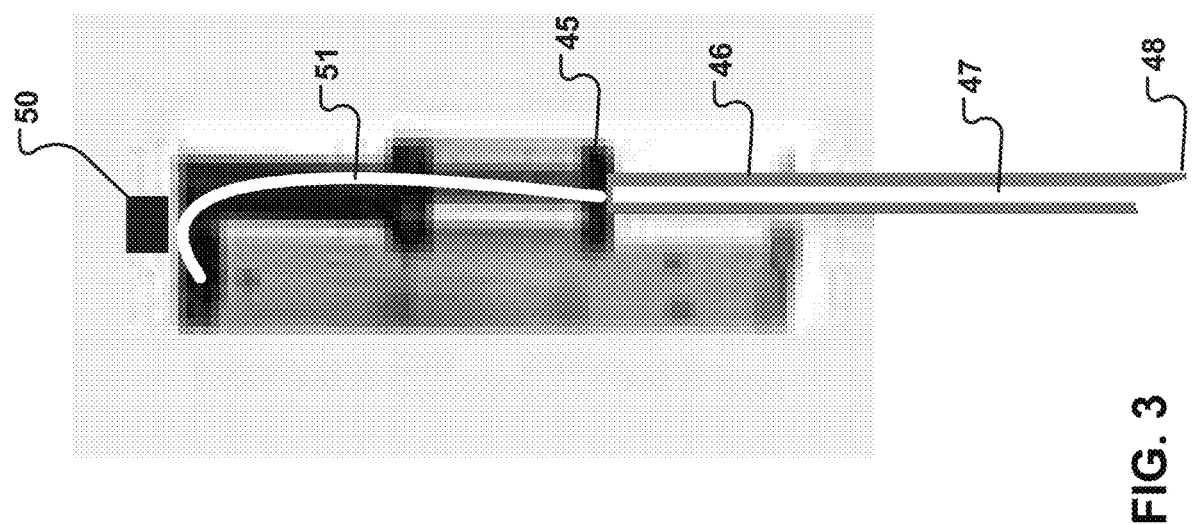
FIG. 3 is a cut away side view of an example robotic probe that is part of the medical diagnostic system.

In this case, the stopper includes a top part 31a and side parts 32a that conform to the inner walls of the vial and that create the air-tight/fluid-tight seal between the stopper and the vial. As shown in FIG. 2, shaft 29 pierces and penetrates stopper 31 until shaft 29 extends into the interior volume 34 of the vial. Shaft 29 may continue into the interior until it reaches the bottom 35 of the vial. After the probe's shaft is retracted from the vial and the stopper, the material that forms the stopper caves-in on the hole created by the shaft, thereby reforming the air-tight/fluid-tight seal between the stopper and the vial. In other words, the stopper self-seals after the probe's shaft is retracted, thereby reforming the air-tight/fluid-tight seal. When the stopper self-seals, any equilibration previously performed can be maintained An example of a robotic probe 44 that may be used in system 10 is shown in FIG. 3. In this example, probe 44 is robotic in the sense that it is machine-controllable to move, to aspirate, to dispense, and to perform other operations absent manual manipulation. In some implementations, the robotic probe may be user-controllable in the sense that the control system may receive user inputs as to how the probe is to operate, e.g., what tests to perform. But, after those user inputs are received, the robotic probe may be controlled automatically by the control system—for example, the robotic probe may be controlled to equilibrate pressure, to transport a substance, and/or to mix substances in the manners described herein.

Probe 44 includes a housing 45 and a shaft 46 having a lumen 47. Shaft 29 of FIG. 2 may have the same configuration as shaft 46. An example shaft and lumen structure includes a needle. As shown in FIG. 3, shaft 46 has a tip 48 that is pointed to pierce through the stopper 31 of a vial 32 (FIG. 2) and to enter the interior of the vial. Liquid substances are aspirated from, or dispensed into, a vial through lumen 47 in shaft 46. Probe 44 is also connected to a pressure sensor 50. Pressure sensor 50 may be a wired or wireless pressure sensor in that its readings may be transmitted to the control system over a wired connection or over a wireless connection. Pressure sensor 50 is configured to detect the pressure inside a vial after the stopper has been pierced by the probe's shaft. Information representing the pressure inside the vial is sent to the control system, which may then control the probe to change—for example, to increase or to decrease—the pressure in the interior of the vial as described herein.

Figure 4:
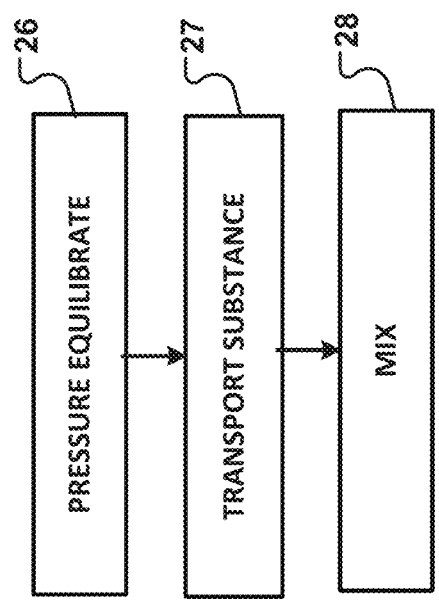
FIG. 4 is a flowchart showing an example method of processing substances using the techniques described herein.

Referring to FIG. 4, the probe may be used for pressure equilibration (26) or pressure correction on a container such as a vial. Following pressure equilibration correction, the same probe or a different transport probe may transport (27) substance from a different container to the container or vial that has been subjected to pressure equilibration or correction. And, following substance transport, the same probe or a different mixing probe may mix (28) the substance that was transported with another substance in the container or vial as described herein.

Pressure equilibration includes aspirating and/or dispensing air as part of a transfer to keep control of vial pressure. Pressure equalization may be implemented in at least two instances: before a sealed vial is used (e.g., to change internal pressure set at manufacturing) or during the use of the vial. Some air transfers, particularly those that are larger such as 10 mL or greater, may be implemented by actively controlling operation of the probe. The techniques described below include actively adding air to a vial or removing air from a vial. In some implementations, the air moved to or from a vial is controlled to keep the vial at a slight vacuum—that is, at a slightly negative pressure relative to ambient pressure such as those described above.

This slightly negative pressure may prevent liquid from escaping from the vial when the probe is removed from the vial through the hole in the seal or stopper created by the probe. In some implementations, the target pressure may be 1% less than ambient pressure, 2% less than ambient pressure, 3% less than ambient pressure, 4% less than ambient pressure. 5% less than ambient pressure, 6% less than ambient pressure, 7% less than ambient pressure, 8% less than ambient pressure, or 9% less than ambient pressure. In an example, ambient pressure is standard atmospheric pressure, which is defined in various units as 760 millimeters (mm) (29.92 inches) of mercury, 14.70 pounds-per-square-inch, 1,013.25×103 dynes-per-square-centimeter, 1,013.25 millibars, or 101.325 kilopascals pressure at sea level. Notably, however, target pressures other than the examples presented herein may be achieved using the system, the probe, and the techniques described herein.

The target pressure for inside the vial may be set by the control system based on the type of assay to be performed, the preparation process associated with the assay, the substance in the vial, and/or the substances used in the assay, for example.

Equilibrating the pressure to close to ambient pressure may reduce the chances that substances be inadvertently drawn into the vial or expelled from the vial due to the internal pressure of the vial. If the internal pressure is much higher than the ambient pressure, when a substance is added the internal pressure will increase, and when the probe is removed, some of the substance may come out with the probe to the outside of the stopper because the higher internal pressure pushes it out. If the internal pressure of the vial is much lower than the ambient pressure then, when some substance is dispensed into the vial, the lower pressure (vacuum) may pull more substance from the probe than what is required, including bringing some hydraulic fluid into the vial and making the dispensing more difficult to control.

In an example pressure equilibration process 115 (FIG. 14), the probe's shaft 46 (FIGS. 10 and 12) enters (115a) the interior volume of vial 32. This creates a fluidic pathway along the shaft's lumen between the interior of the vial and pressure sensor 50 (FIG. 3). Pressure sensor 50 connected to or part of or on shaft 46 detects (115b) the internal pressure of the vial. The pressure sensor sends data representing the internal pressure to the control system. The control system compares the detected pressure to a target pressure, such as a pressure that is slightly less than ambient pressure, in order to determine if the detected pressure deviates from the target pressure by more than an acceptable amount. For example, an unacceptable deviation may include a 2% deviation, a 5% deviation, or more. The target pressure for each vial may be stored in memory in the control system. The control system may control operation of the probe to adjust the internal pressure of the vial based on this target pressure.

The control system determines (115c) that the internal pressure of the vial deviates from the target pressure by an unacceptable amount. Accordingly, the control system controls probe 44 (FIG. 3) to adjust the internal pressure of the vial toward the target pressure. As previously noted, the target pressure may be a negative pressure or a positive pressure that is different from the initially-detected internal pressure of the vial. In this regard, assuming that the target pressure is slightly less than ambient pressure and that the internal pressure is a negative pressure and below the target pressure, the control system controls the probe to aspirate (115e, FIG. 14) air from the outside of the vial into its shaft, to move to the location of the vial, to pierce the vial's stopper with the probe shaft, and to dispense (115f)—that is, to inject—the aspirated air into the vial, thereby increasing the air pressure within the vial. The amount of air that is aspirated may be a predefined amount that is programmed into the control system. The pressure sensor 50 connected to or on or part of the probe then reads the new pressure in the vial—that is, the pressure that resulted after the air was added to the vial. The pressure sensor then sends data representing the new pressure to the control system.

The system may then repeat operations 115b to 115f (FIG. 14) until the target pressure is reached inside the vial, or until a pressure within an acceptable range of the target pressure is reached inside the vial. In this regard, in some implementations, examples of an acceptable range may include a 1% deviation from the target pressure, a 2% deviation from the target pressure, a 3% deviation from the target pressure, a 4% deviation from the target pressure, a 5% deviation from the target pressure, a 10% deviation from the target pressure, and so forth.

For vials that have not previously been used, e.g., manufactured and known to be at a predefined pressure that is close to vacuum, air may be repeatedly injected from the probe into the vial without the probe having to leave the vial. For example, after the first injection of external air into the vial by the probe, the probe may aspirate air from the vial and inject the aspirated air back into the vial multiple times without leaving the vial. This repetition may cause equilibration of the air pressure in the vial to the ambient pressure.

In some examples, the probe may be pre-programmed to aspirate and inject air into the vial a predefined number of times that is independent of measurements by the pressure sensor. In an example situation, the control system identifies a previously unused vial from a source that is known to be at near vacuum. Air is injected a predefined number of times, for example, 4 to 7 times, to reach equilibration. In other examples, the probe may aspirate and inject air into the vial 20 times; however, other numbers of times may be used, such 10 times, 30 times, 40 times, and so forth.

Figure 5:
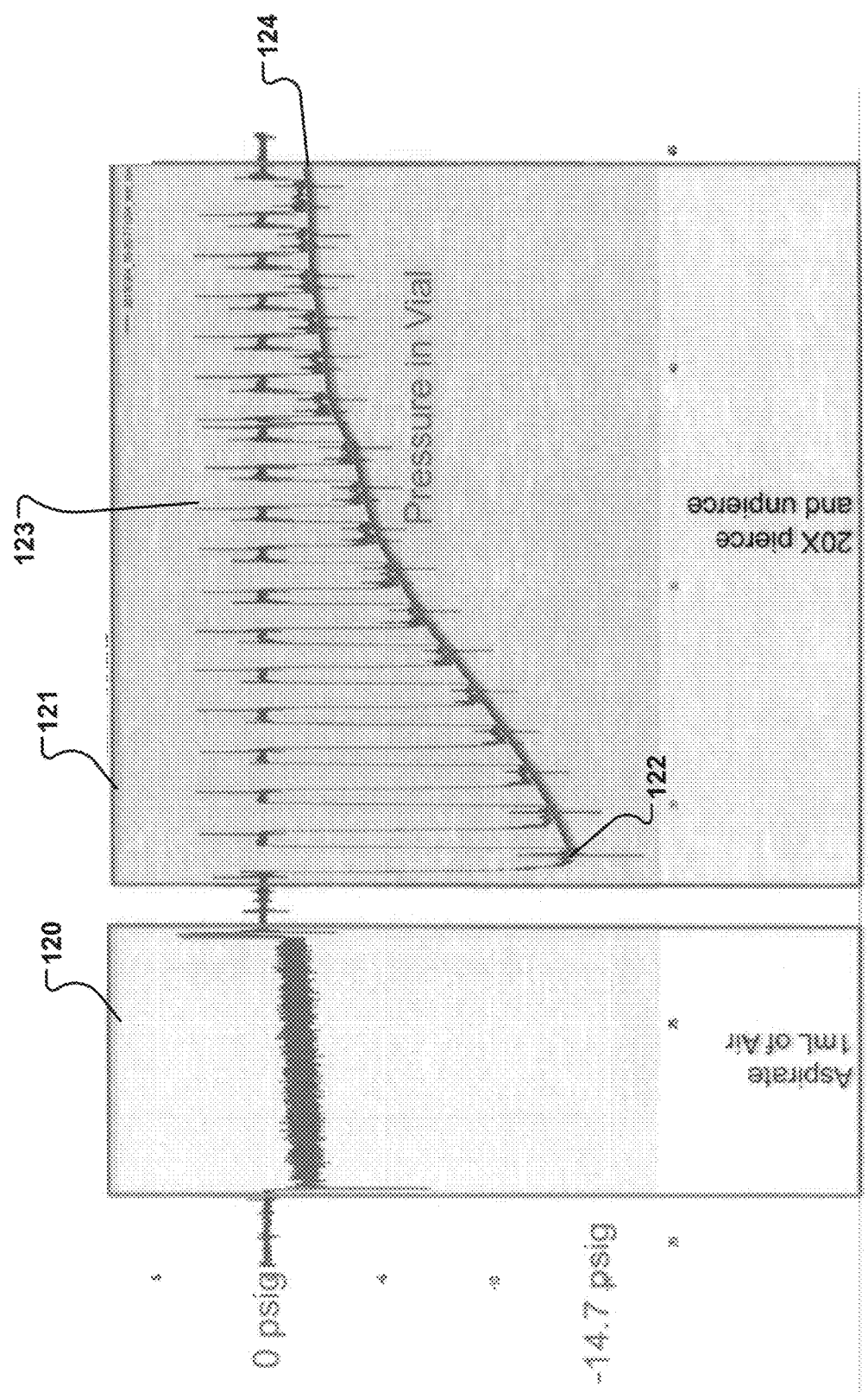
FIG. 5 is an example graph showing a build-up of pressure in a container in response to repeated aspirations of air into the container.

FIG. 5 shows pressure 120 in pounds per square inch, gauge (psig). In this regard, a container that initially is vacuum sealed—for example, does not hold any air (e.g., at near vacuum internal pressure), would be approximately −14.7 PSIG. 0 PSIG is used as a surrounding/ambient air pressure. In this example, the pressure 121 within a vial starts out at level 122 that is close to vacuum pressure. Air is aspirated into the vial 20 times in this example, with each peak 123 representing an aspiration of air. Each individual amount of air that is injected may be less than that required to reach equilibrium, with equilibrium reached after multiple injections. The end pressure 124 in the vial is at or slightly below the surrounding air pressure, as shown in the figure.

Figure 14:
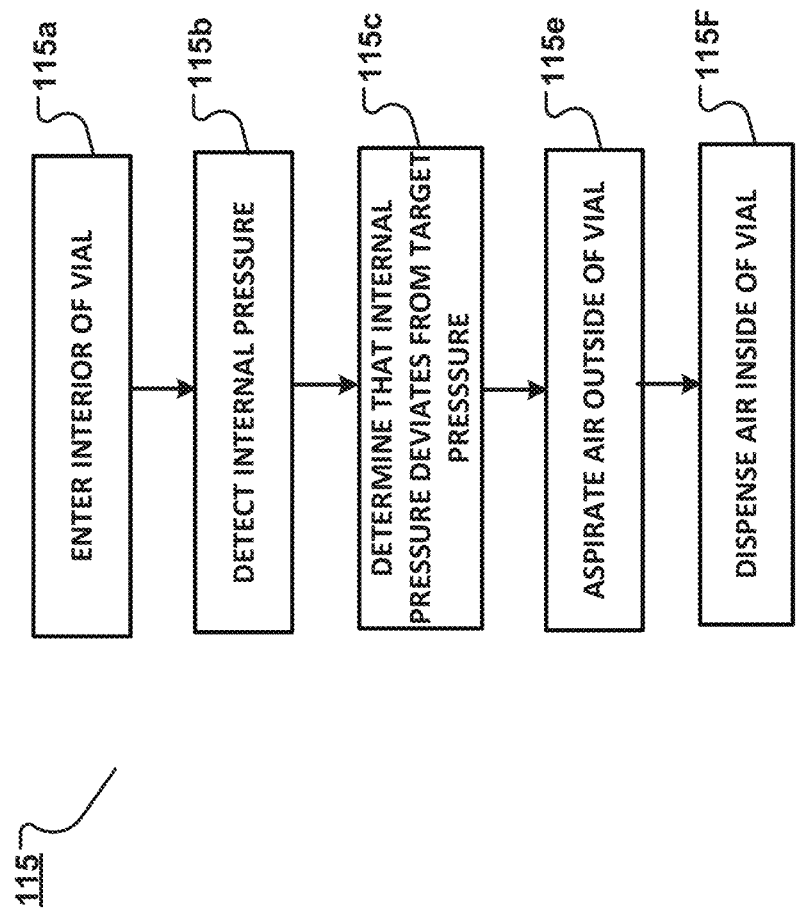
FIG. 14 is a flowchart showing an example process for adjusting pressure in a vial or other container that has an initial pressure below a target pressure.

Referring to FIG. 14, for vials not known to be at vacuum pressure, operations 115c to 115f may be repeated based on readings from pressure sensor 50 as described above. Each time after air is added to the vial, pressure sensor 50 connected to or part of or on the probe reads the new pressure in the vial—that is, the pressure that resulted after the air was added to the vial. The pressure sensor then sends data representing the new pressure to the control system. These operations may be repeated multiple times in order to achieve the target pressure within the vial. If the pressure unacceptably exceeds the target pressure as a result of the addition of too much air to the vial, an amount of air may be removed from the vial to keep the pressure inside the vial at the target pressure, e.g., ambient pressure, as described below.

Figure 15:
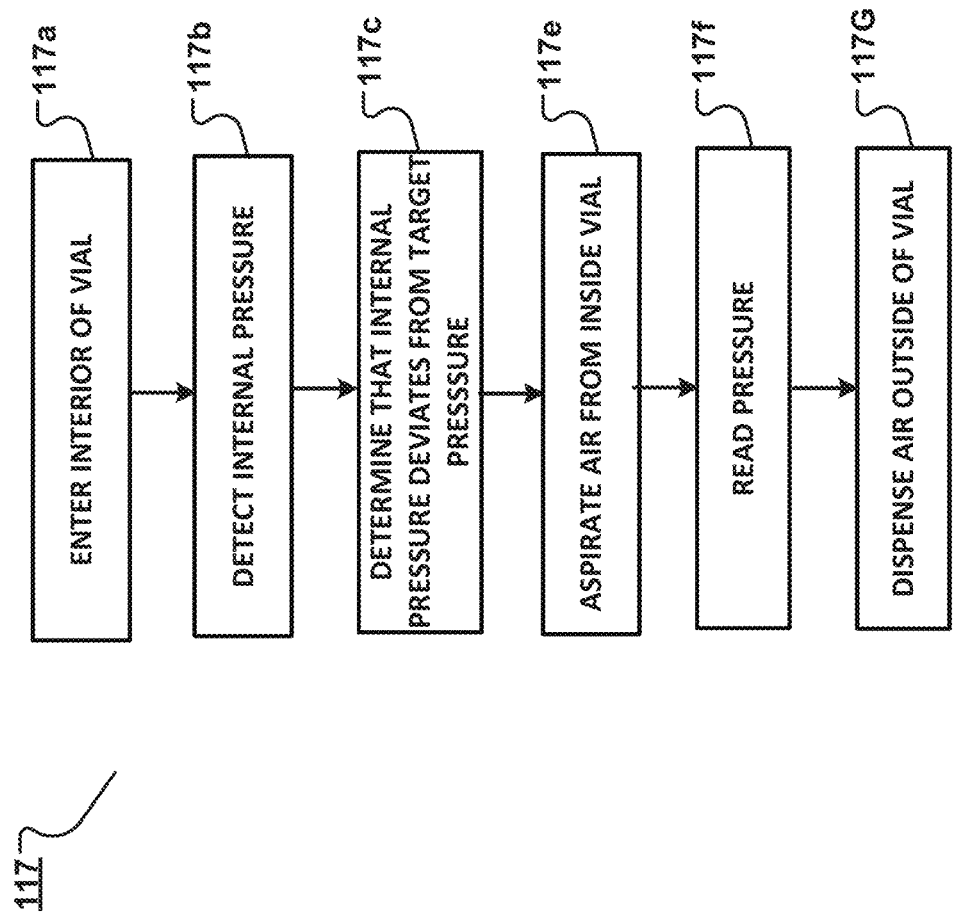
FIG. 15 is a flowchart showing an example process for adjusting pressure in a vial or other container that has an initial pressure above a target pressure.

In this regard, example process 115 of FIG. 14 illustrates a case where the internal pressure of the vial is negative. Example process 117 of FIG. 15 includes operations that are performed by the system when the internal pressure in a vial is positive relative to the target pressure. The operations may be performed on a vial that has not previously been used or on a vial to which too much air has been added to cause the internal pressure to exceed the target pressure. More specifically, in the case of a target vial such as vial 32 (FIG. 2), the probe's shaft 46 (FIG. 46) first enters (117a) the interior volume of that vial. Pressure sensor 50 connected to or on or part of shaft 46 detects (117b) the internal pressure of the vial in the manner described above with respect to process 115. The pressure sensor sends data representing the internal pressure to the control system.

The control system compares the detected pressure to a target pressure, such as a pressure that is slightly less than ambient pressure, in order to determine if the detected pressure deviates from the target pressure by more than an acceptable amount. The control system determines (117c) that the internal pressure of the vial deviates from the target pressure. Accordingly, the control system controls the probe to adjust the internal pressure of the vial toward the target pressure. In this example, the internal pressure is a positive pressure, and the target pressure is slightly less than ambient pressure. Accordingly, the probe vial aspirates (117e) a predefined amount of air from the vial, thereby decreasing the air pressure within the vial. The predefined amount may be programmed into the control system based on the substance in the vial and the assay to be performed using the vial. The pressure sensor 50 then reads (117f) the new pressure in the vial—that is, the pressure that resulted after the air aspirated from the vial into the probe. The pressure sensor 50 then sends data representing the new pressure to the control system. The probe also exits the vial and dispenses (117g) the air that was aspirated from the vial in a region outside of the vial.

The control system may then repeat process 117 or portions thereof until the target pressure is reached inside the vial, or a pressure within an acceptable range of the target pressure is reached inside the vial. Regarding repeating the process, the control system determines whether the new internal pressure of the vial deviates (117c) from the target pressure. If so, then the control system controls the probe to adjust the new internal pressure of the vial further toward the target pressure.

As noted, assuming that the internal pressure is positive pressure and the target pressure is slightly less than ambient pressure, the control system controls the probe to retract from the vial completely, to dispense air from the probe that has aspirated from the vial, to pierce the vial's stopper again with the shaft, and to aspirate additional air from the vial. The pressure sensor 50 connected to or on or part of the probe then reads the new pressure in the vial—that is, the pressure that resulted after the additional air was aspirated the vial. The pressure sensor sends data representing the new pressure to the control system. These operations may be repeated multiple times to reach target pressure within the vial. If the pressure goes unacceptably below the target pressure, which may be caused by removing too much air from the vial, an amount of air to keep the pressure inside the vial at the target pressure may be added to the vial as described above.

In some implementations, following initial pressure measurement, the control system may determine the number of aspirations from the vial that are needed to obtain the target pressure. For example, the control system may know the volume that the probe can aspirate, and the amount of air needed to aspirate for the vial to reach the target pressure. The control system may then control the probe to make a number of aspirations from the vial to keep the pressure inside the vial at the target pressure Some air transfers may self-equalize due to minor air exchange as the probe enters or leaves a vial. In an example implementation, air may be aspirated into the probe before entering the vial. When the probe penetrates the vial, a pressure differential between the probe and the interior of the vial causes air to go into or out of the vial and thereby self-equalize the internal pressure. For example, if the pressure in the vial is greater than the pressure in the probe, air may transfer from the vial to the probe, thereby decreasing the pressure in the vial. In another example, if the pressure in the vial is less than the pressure in the probe, air may transfer from the probe to the vial, thereby increasing the pressure in the vial. This may be implemented without actively injecting or removing the air. Techniques such as these are referred to as passive pressure control techniques since they do not require hydraulic operation of the probe while the probe is in the vial in order to implement an air transfer. These techniques may be used, for example, if too much air is added to, or removed, from a vial and small additional changes in pressure needed. Passive techniques, however, are not limited to use in this context.

The foregoing operations may be performed to reach a pressure equilibrium between the internal pressure of the vial and the target pressure. After the target pressure is reached or within an acceptable range, the probe may retrieve substances and transport the retrieved substances to the vial for addition to the vial.

In some implementations, such as those described below, adding substance to a vial may also include adding air to the vial. Additionally, air may be extracted from the vial or leak from the vial. This may change the air pressure in the vial—for example, increase the air pressure within the vial to an unacceptable level. Accordingly, the techniques described herein may be used to adjust the pressure within the vial during substance transfer—for example, in between two consecutive substances transfers. By way of example, when a substance is dispensed into the vial, the pressure sensor connected to or part of or on the probe shaft sends data to the control system representing the pressure in the interior of the vial. The control system determines whether the internal pressure of the vial deviates from the target pressure by an unacceptable amount. If so, then the control system controls the probe to adjust the internal pressure of the vial toward the target pressure. In an example, the internal pressure exceeds the target pressure by an unacceptable amount. Accordingly, the control system controls the probe to move to a location in the vial that does not include substance to be mixed, and to aspirate air from the vial, thereby decreasing the air pressure within the vial. The amount of air that is aspirated may be based on the pressure change that is desired. The pressure sensor 50 connected to or part of or on the probe then reads the new pressure in the vial—that is, the pressure that resulted after the air aspirated from the vial into the probe. The pressure sensor then sends data representing the new pressure to the control system. The control system may then repeat the operations described above until the target pressure is reached inside the vial, or a pressure within an acceptable range (e.g., 1%, 2%, etc.

deviation) of the target pressure is reached inside the vial. If the pressure goes unacceptably below the target pressure, an amount of air may be added to the vial to keep the pressure inside the vial at the target pressure as described above. For example, as described above, the control system controls the probe retract from the vial, to aspirate air into its shaft, to pierce the vial's stopper again, and to dispense—that is, to inject—the aspirated air into the vial. The pressure sensor 50 connected to or on or part of the probe then reads the new pressure in the vial—that is, the pressure that resulted after the air was added to the vial. The pressure sensor then sends data representing the new pressure to the control system, which may further adjust the pressure, if necessary. Thus, pressure control and/or equilibration may be performed between transfer of substances into a vial and/or during transfer of substances into a vial, as described above.

When aspirating substances such as liquid substance, e.g., a reagent, from a vial, the pressure in the vial decreases, One effect of this pressure change is an expansion of any air gaps in the probe—for example in its shaft as described with respect to FIGS. 7 and 8 below. When these air gaps expand, the air gaps reduce the total volume of substance that can be drawn into the probe. To address this, particularly in the case of aspirating liquid, the control system may keep track of the volume of substance aspirated into the probe and predict the expansion of the air gaps in the probe using gas expansion calculations, such as the ideal gas law. The volume of substance of the probe may be tracked by keeping a record of the volumes of substance, including substance and air, that has been aspirated into the probe. Based on the predicted expansion of the air, the control system may perform a correction to account for the predicted expansion of the air. For example, after the probe has been emptied of a dispensed substance, the control system may control the probe to aspirate additional substance, such as liquid reagent, from the vial in order ensure that the proper amount of substance has been transferred and the pressure in the vial is maintained at the target pressure. Pressure equilibration may be performed after substance transfer, if necessary.

Referring back to FIG. 3, in an example, probe 44 includes a hydraulic connection, which may be or include a tube 51—also referred to as a "line"—that holds hydraulic fluid. An example of hydraulic fluid is DI water; however, other types of fluid, such as ACL TOP Rinse solution may be used as the hydraulic fluid. Tube 51 is in fluid communication with lumen 47 of shaft 46. This fluid connection enables air to flow between the shaft and the tube; that is, from the tube into the shaft and from the shaft into the tube. The latter flow can occur when air or substances are aspirated into the probe and the former flow occurs when the air or substances are dispensed from the probe. That is, air flow from the shaft into the tube produces suction that enables aspirating. Air flow from the tube into the shaft produces pressurized air in the shaft that enables dispensing. Thus, the hydraulic fluid may be controlled by the control system to flow in a direction toward the shaft to cause positive pressure in the probe's shaft to dispense air or substance therefrom. The hydraulic fluid may be controlled by the control system to flow in a direction away from the probe's shaft to cause negative pressure in the probe's shaft to aspirate air or substance into the probe's shaft.

In some implementations, housing 45 and shaft 46 are made of metal, such as a stainless-steel alloy or any material that yields similar or better performance than stainless-steel alloy, and tube 51 is made of plastic, rubber, or any other pliable material that yields similar or better performance than plastic or rubber. Due to the differences in pliability between the tube and the housing/shaft part of the probe, the interface between the tube and the housing/shaft part of the probe may not be air-tight/fluid-tight. As a result of this imperfect seal at the interface, hydraulic fluid may leak from tube 51 into shaft 46, thereby contaminating (e.g., diluting) the substance aspirated into the shaft, as described previously. To address this potential contamination, the probe is controllable by the control system to create multiple sections—for example air and liquid substance sections—between the hydraulic fluid and the substance to be dispensed by the probe. For example, the probe is controllable by the control system to create an air gap between the hydraulic fluid and a substance in the shaft and to create multiple downstream layers of substance in the shaft, with each layer of substance being separated from an adjacent layer of substance by an air gap. As described below, there may be between three and five sections of air and substance, or more if needed. However, the system is not limited to any specific number of pairs of air and substance.

Figure 6:
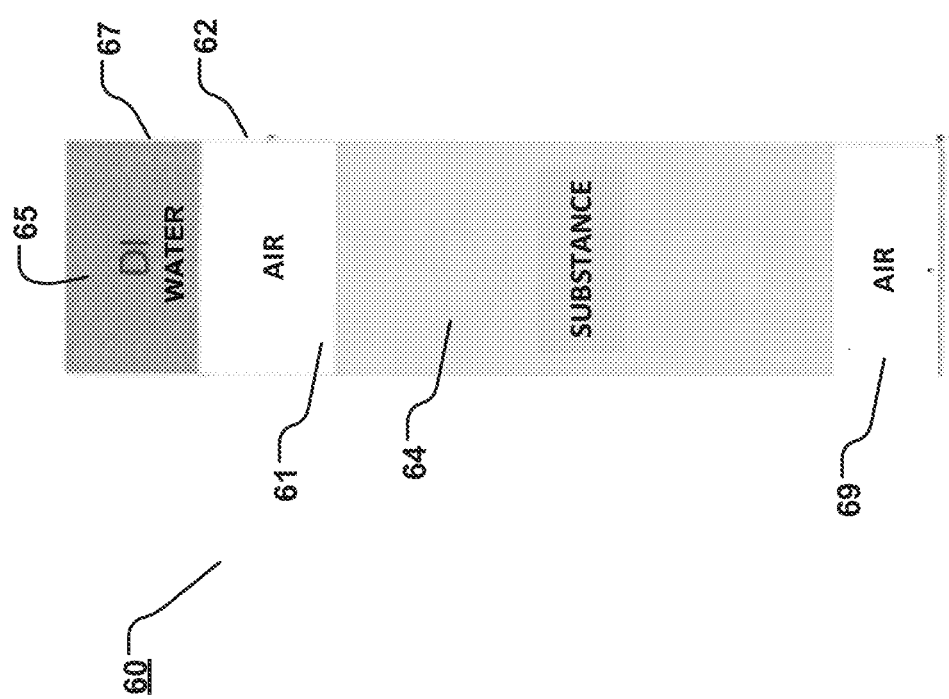
FIG. 6 is a cut away side view of an example probe shaft containing aspirated air and substance to be dispensed.

FIG. 6 shows the result of a technique in which the control system controls the probe to aspirate air 61 into shaft 62 and then to aspirate, into the shaft, a substance 64 to be dispensed. Air 61 aspirated before substance 64 produces an air gap between substance 64 and hydraulic fluid 65 (DI water) in tube 67. This air gap creates pressure in the shaft that may reduce leakage of hydraulic fluid into substance 64. The control system also controls the probe to aspirate air 69 into the shaft 62 after aspirating substance 64. This creates a second air gap that may reduce the chances that substance 64 inadvertently leaks from the probe. Although there may be reductions in leakage, the configuration of FIG. 6 may produce enough hydraulic fluid leakage to significantly contaminate substance 64 to be dispensed. Accordingly, additional section(s) are added as shown in FIGS. 7 and 8 to address this issue.

Figure 7:
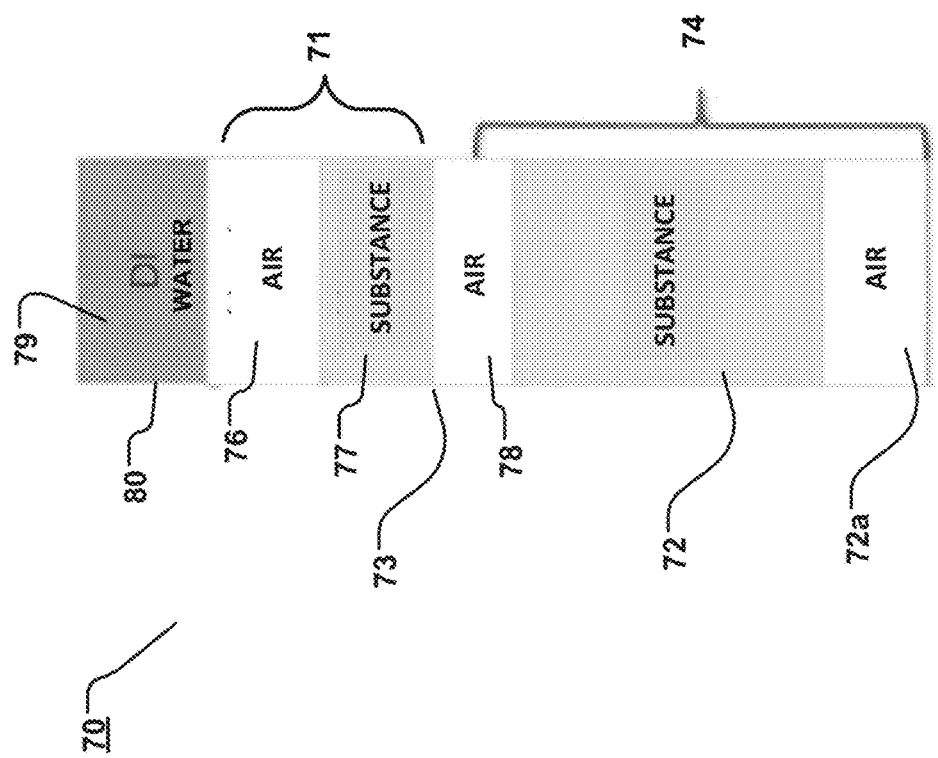
FIG. 7 is a cut away side view of an example probe shaft containing aspirated air and substance to be dispensed, along with a section of substance and air for absorbing leakage of hydraulic fluid.

FIG. 7 shows the result of an example technique in which the control system controls the probe to aspirate a section 71 including substance and air that is upstream of substance 72 to be dispensed from shaft 73. In this example, substance 72 to be dispensed by the probe corresponds to substance 64 from FIG. 6. In some examples, the transfer volume of the substance is always the same for a specific transfer no matter how many sections are used. That is, in some examples, the volume of substance in the sections does not change the volume of the substance to be transferred, which is a volume needed for the preparation.

The air gaps in FIG. 7, however, may have the same or smaller volumes as the air gaps of FIG. 6. In the example of FIG. 7, before aspirating substance 72 to be dispensed, the control system controls the probe to aspirate a first volume of air 76 outside of a vial to produce an air gap, then to aspirate a first volume of substance 77 from inside of a vial, then to aspirate a second volume of air 78 outside of a vial. The resulting section 71 of air 76 and substance 77 separates substance 72 to be dispensed from hydraulic fluid 79 (e.g., DI water) in tube 80. As described previously, air pressure provided by air 76 may reduce leakage of hydraulic fluid 79. However, if hydraulic fluid leaks into the shaft, all or some of that hydraulic fluid may be absorbed by substance 77 in section 71. As a result, no hydraulic fluid, or a lesser amount of hydraulic fluid, will reach substance 72 to be dispensed than in the configuration of FIG. 6. As described previously, pressure produced by air 78 may reduce the likelihood and/or amount of fluid leaks into substance 72. As a result, substance 72 will not be contaminated by, or will have less contamination, than if section 71 were not present in the shaft. The control system also controls the probe to aspirate air 72*a* into the shaft after aspirating substance 72. This creates and air gap that may reduce the chances that substance 72 inadvertently leaks from the probe.

Figure 8:
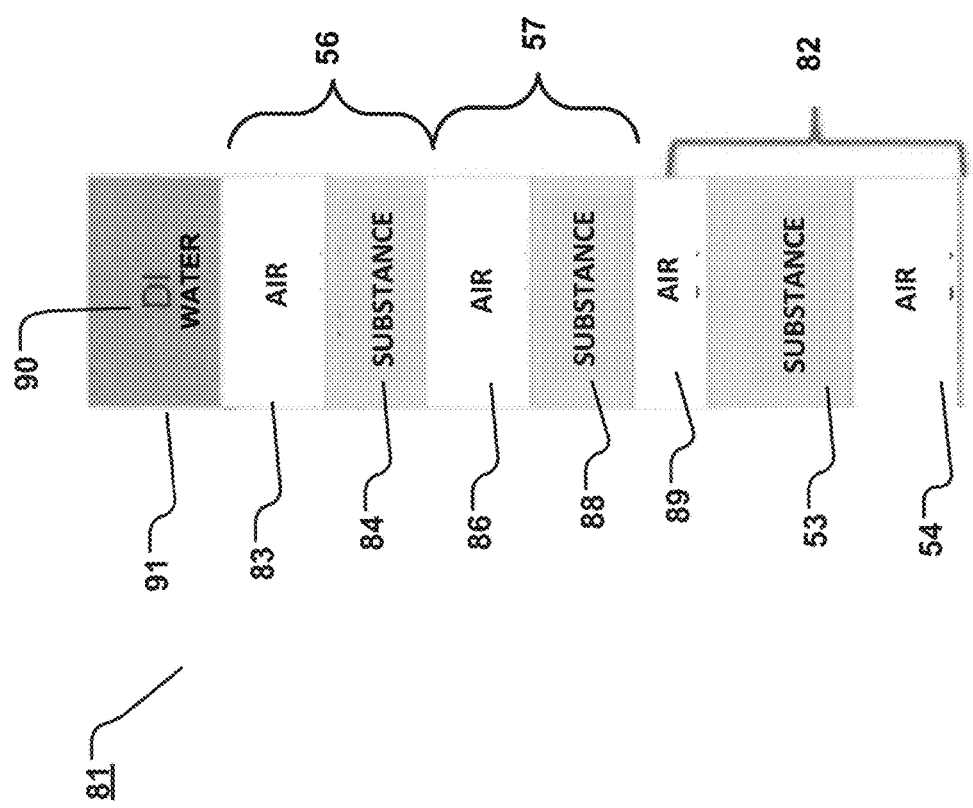
FIG. 8 is a cut away side view of an example probe shaft containing aspirated air and substance to be dispensed, along with two sections of substance and air for absorbing leakage of hydraulic fluid.

FIG. 8 shows the result of an example technique that extends the example described with respect to FIG. 7. More specifically, FIG. 8 shows the result of an example technique in which the control system controls the probe to aspirate two sections 56 and 57, each comprised of substance and air, that are upstream of substance 53 to be dispensed by the probe. In this example, substance and air 82 to be dispensed by the probe corresponds to substance and air 74 from FIG. 7. The air gaps may have the same volumes as the counterpart air gaps of FIG. 7 or may have lesser volumes. In this example, before aspirating substance 53 to be dispensed, the control system controls the probe to aspirate a first volume of air 83 from outside a vial to produce an air gap, then to aspirate a first volume of substance 84 from inside a vial. The control system then controls the probe to aspirate a second volume of air 86 from outside a vial to produce an air gap, then to aspirate a second volume of substance 88 from inside a vial. The control system then controls the probe to aspirate a third volume of air 89 from outside a vial.

The two sections 56 and 57 separate substance 53 to be dispensed from hydraulic fluid 90 (DI water) in tube 91. As described previously, air pressure provided by each air gap may reduce leakage of hydraulic fluid through and beyond that air gap. However, if the hydraulic fluid leaks into the shaft, all or some of that hydraulic fluid may be absorbed by substance 84 and substance 88. As a result, no hydraulic fluid, or less hydraulic fluid, will reach the substance 53 to be dispensed. More specifically, hydraulic fluid that leaks through air 83 will be absorbed by substance 84. Hydraulic fluid that leaks through both substance 84 and air 86 will be absorbed by substance 88. As described previously, pressure produced by air 89 may reduce likelihood and/or among of fluid leaks into substance 53. As a result, substance 53 will not be contaminated by, or will have less contamination, than if sections 56 and 57 were not present in the shaft.

In the implementations of FIGS. 7 and 8, for example, by using layers of substance separated by air gaps or sections of substance-air gap, the probe can reduce the amount of hydraulic fluid in the substance that is dispensed to the vial to make it insignificant. That is, while some hydraulic fluid may leak into layers of substance nearer to the interface even in the presence of air gaps, by separating the hydraulics from the remainder of the probe, most or all the hydraulic fluid will be absorbed by layers of substance closest to the interface before the hydraulic fluid reaches the layer or layers of substance to be dispensed into the vial (or cuvette).

In some implementations, there may be more than two sections 56 and 57 of air and substance in the shaft upstream of substance 53 to be dispensed. For example, there may be three sections of air and substance (three sections) in the shaft upstream of the substance be dispensed. For example, there may be four sections of air and substance (four sections) in the shaft upstream of the substance be dispensed. For example, there may be five sections of air and substance (five sections) in the shaft upstream of the substance be dispensed. For example, there may be six sections of air and substance (six sections) in the shaft upstream of the substance be dispensed. The number of sections to create may be predefined by the control system and may be based, for example, on the assay to be performed. In some example, the greater the number of sections upstream of the substance to be dispensed, the less likely that the content to be dispensed will become contaminated with hydraulic fluid.

Figure 16:
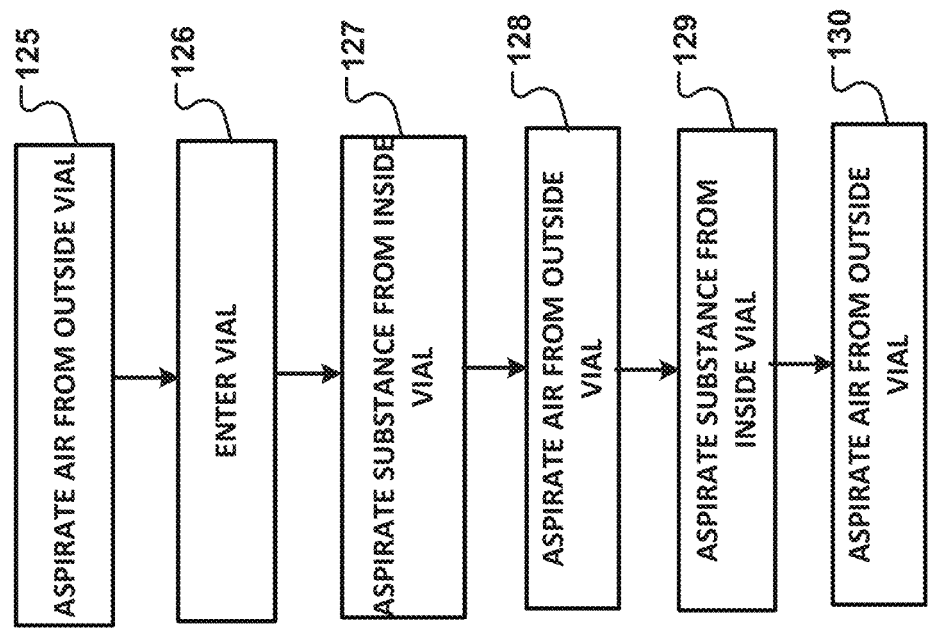
FIG. 16 is a flowchart showing an example process for creating sections containing air and substance in a probe shaft.

Referring to the example process of FIG. 16 and the example of FIG. 7, to create section 71, the control system controls the probe to aspirate (125) air 76 from outside of a vial containing a substance to be dispensed. The control system may control the probe to enter (126) the vial containing substance and to aspirate (127) that substance from the vial. The control system may control the probe to aspirate (128) air 78 either from inside the vial or outside the vial based, for example, on pressure considerations within the vial as described herein. For example, if the pressure in the vial exceeds a target pressure, air 78 may be aspirated from within the vial. If the pressure in the vial is at the target pressure, the probe may be removed from the vial and air 78 may be aspirated from external to the vial. The probe may again enter the vial to aspirate (129) substance 72. Thereafter, the air 72a may be aspirated (130) from within or outside of the vial, as was the case above. The amounts to aspirate may be controlled by the control system based, for example, on predefined parameters or the assay being performed. These operations may be repeated as necessary based on the number of sections to be formed within the probe, which may be based on factors such as the assay to be performed or the substances being used in the assay.

The positive pressure in the probe is determined and controlled to dispense the layer or layers of substance (e.g., substance 72 or 53) in the shaft that are farthest from the interface between the hydraulics and the remainder of the probe. Those layers may contain no, reduced, or minimal contamination, from the hydraulic fluid. The control system may determine the positive pressure to apply to the probe based, for example, on predefined parameters stored in memory, the assay being performed, the substance being aspirated, and any other information needed for the accurate and effective pressure adjustment and equilibration. In some implementations, the amount of substance to be dispensed may be based on the size of the shaft and the number of sections of air and substance that precede the substance to be dispensed. In some implementations, the volume of substance to be dispensed that may be aspirated is on order of fives or tens of microliters—for example, 5 µL, 10 µL, 15 µL, 20 µL, 25 µL, 30 µL, 35 µL, 40 µL, 45 µL, 50 µL, and so forth. This amount may be more than the amount of substance used in the sections. In the example implementations of FIGS. 7 and 8, the shaft can aspirate a total of 1,100 microliters (µL) of content including air gaps, substance, and sections; however, in other implementations, different amounts of content may be aspirated depending, in part, on the size of the probe.

In some implementations, each air gap is on order microliters (µL) of air—for example, 1 µL, 5 µL, 10 µL, 15 µL, 20 µL, 25 µL, 30 µL, 35 µL, 40 µL, 45 µL, 50 µL, and so forth. Air gaps having volumes other than these may also be used. In some implementations, the substance in each section may be 10 µL, 20 µL or other amounts such as 5 µL, 15 µL, 25 µL, 30 µL, 35 µL, 40 µL, 45 µL, 50 µL, and so forth. In some examples, each section has the same volume of substance not matter how many sections are used. In some implementations, the more sections that are used, the smaller the amount of substance in each volume there is.

The substance included in the sections, such as sections 56 and 57, is the same substance that is to be dispensed by the probe. The control system calibrates positive pressure in the shaft based on the size and/or number of sections to ensure that the sections are not dispensed with substance or to reduce the chances that the sections will be dispensed with substance. For calibration, the pressure is measured by the pressure sensor and is equilibrated based of the difference relative to the ambient pressure. The volume to be dispensed is dictated by the command in the preparation software that establishes how much volume (in µL) is to be dispensed. This information has been obtained based on previous experimentation.

In some examples, the same probe that is used to aspirate substances from vials and to dispense substances into vials (e.g., to transport substances) may also be used to mix two or more substances. For example, two or more substances may be mixed within a container, e.g., a vial or a cuvette, in which the substances were dispensed or in another container prior to being transferred into a vial. Mixing of two or more substances may be performed to perform an assay. For example, vials each may hold a substance that is usable to perform an assay on a sample. However, to perform the assay, two or more of the substances may need to be mixed beforehand in some implementations, this mixing may need to be of sufficient duration and to be done with sufficient force to create a mixture of the two substances that is fully or at least partially homogenized (e.g., the mixing may be performed in such way that the analytical performance of these homogenized substances is equivalent to the standard assay, as experimentally assessed). Homogenization includes combining the two substances so that they are each distributed uniformly or consistently in the resulting mixture.

In an example, the mixture may be in a vial and may be based on—for example, formed from—a diluent (e.g., a liquid) and one or both of a liquid substance or a dry substance (e.g., reagent) and may be at least partially homogenized. The duration and force applied to create the mixture may be based on the substances and the total combined volume of the substances in the vial, for example. The mixing process is controlled by the control system using a computer program that is specific to the substances being mixed and the assay to be performed using the substances. The volume and flow rate of the air to be aspirated, the depth of the probe inside the liquid to dispense the air, and the number of times that this procedure happens is controlled by the control system.

Figure 9:
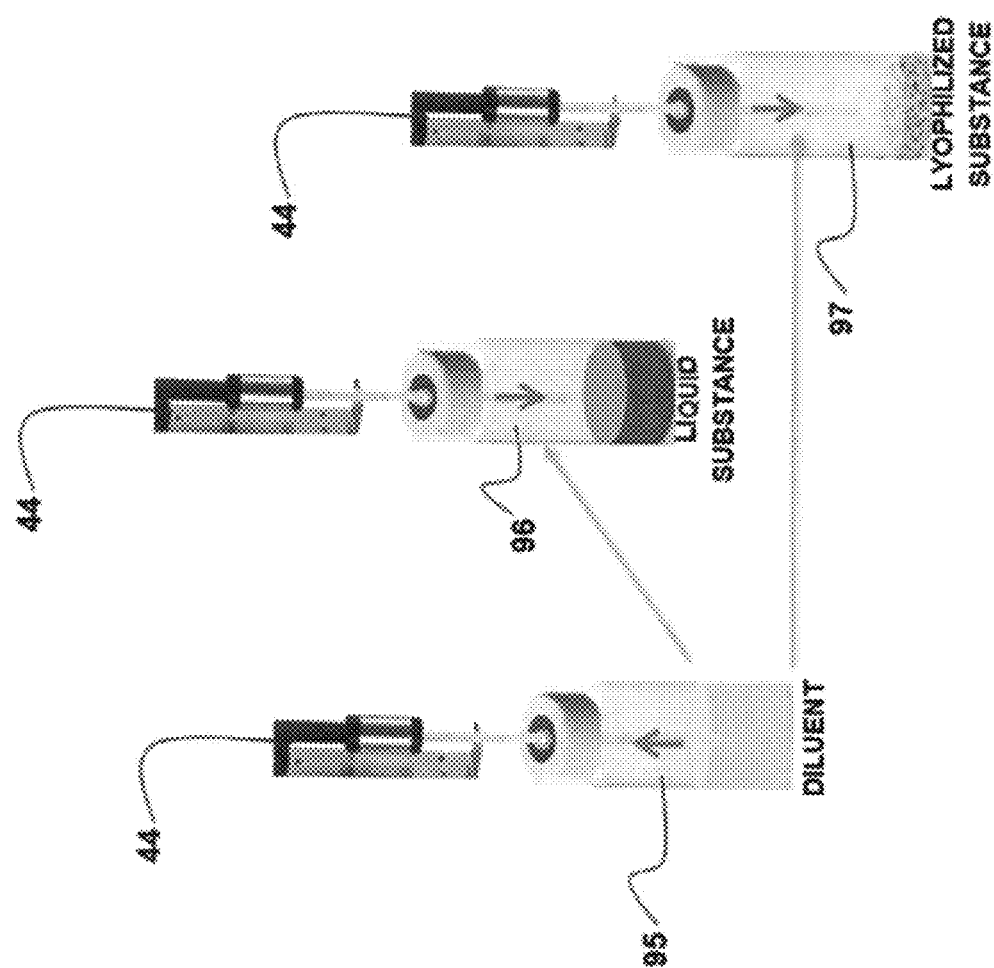
FIG. 9 is a perspective diagram showing example vials containing diluent, liquid substance, and lyophilized substance.

In an example, referring to FIG. 9, the control system may control probe 44 to move diluent from a first vial 95 into a second vial 96 containing liquid substance and/or to a third vial 97 containing lyophilized (dry/solid) substance. Although a liquid diluent and a dry substance are used in these examples, the probe may be used to mix any two or more substances. The probe that moved the substances may also be used to mix the substances Referring to FIGS. 10 and 11, to mix liquid substance and the other substance according to process 102, the control system may control the probe to move (102d) within the vial so that it is not within the substances to be mixed, to aspirate (102e) air into a shaft of the probe from inside the vial; and to dispense (102f) the air 103 (FIG. 10) in the direction of arrow 104 from shaft 46 into the vial with enough force to create an air flow rate to mix the two substances to a level that is deemed sufficient, e.g., mixed in such a way that the analytical performance of these homogenized substances is equivalent to the standard assay, as experimentally assessed. Parameters relating to air volume and flow rate may be obtained from previous experimentation and may be used as information for software commands used in the mixing/homogenization procedure. The air turbulence in the vial resulting from the air flow performs the mixing.

In some implementations, the shaft may be above the substances to be mixed while dispensing the air. In some implementations, the shaft may be immersed in the substances to be mixed while dispensing the air. For example, the tip of the shaft may at or near a bottom of the vial to dispense air into the vial. For example, the tip of the shaft may be in a middle of the substances to be mixed while dispensing the air.

After all the air is dispensed from the probe, additional mixing may be required. The mixing procedure for each substance may be written in the software executed by the control system—for example, it is known how many cycles of mixing are needed from previous experiments for each specific substance or combination of substances. The mixing protocol may be specifically established and fixed for each specific material/assay and written in its specific preparation procedure software, which may be executed by the control system.

In the case of additional mixing, operations 102d to 102g may be repeated as many times as necessary to achieve mixing of the substances in such way that the analytical performance of the homogenized substances is equivalent to the standard assay, as experimentally assessed. In some examples, the mixing process may be repeated any number of times as needed based on previous experimentation.

In some implementations, the air for mixing may be aspirated from outside the vial and introduced into the vial and used, as described above, to implement the mixing. For example, the control system may control the probe to move out of for example, to retract from—the vial, to aspirate air into a shaft of the probe from outside the vial; to cause the shaft to reenter the vial containing the two substances, and to dispense the air from the shaft into the vial. These operations may be repeated as necessary. Pressure equilibration may be performed, as necessary.

The use of air may be advantageous at least because the force to mix/homogenize substances may be stronger than with liquid—e.g., a higher volume of air may be used than liquid and higher flow rate of air may be used than with liquid.

Mixing using air may produce air bubbles. In some cases, the air bubbles burst quickly on their own if the mixture does not contain chemicals that stabilize the bubbles. If the bubbles do not burst on their own in less than a predefined time period, such as 60 seconds or 30 seconds, the bubbles are considered stable. Under these circumstances, air may not be the best way to mix the substances.

Whether mixing/homogenization resulting in air bubbles in substance(s) is used may be controlled by a mixing procedure specifically written for each substance and included in the software for the assay using the substance that is executed by the control system. The volume and flow rate of the air to be aspirated, the depth of the probe inside the liquid to dispense the air, its flow rate, and the volume and the number of times that this procedure occurs also may be specified in the software.

Figure 12:
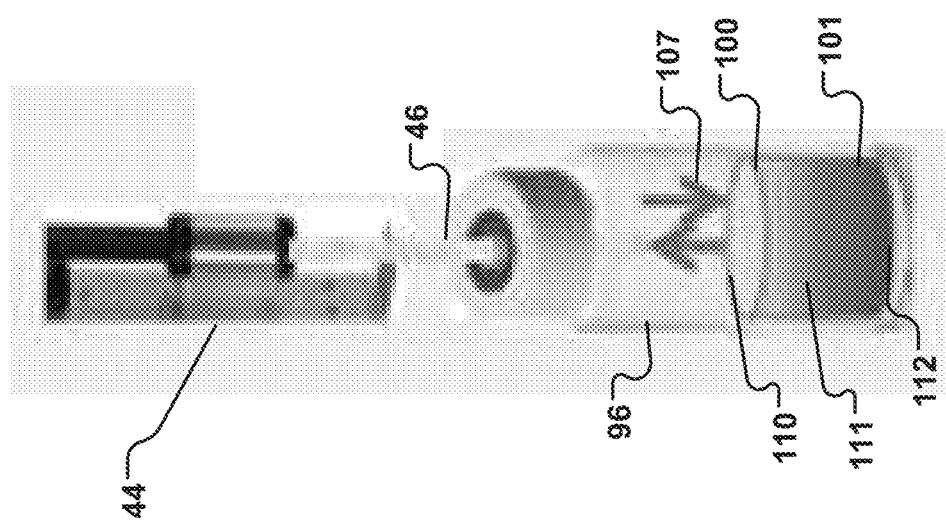
FIG. 12 is a perspective diagram that illustrates, conceptually, mixing substances in a vial using the aspiration and dispensing of the substances themselves as a mixing agent.
Figure 13:
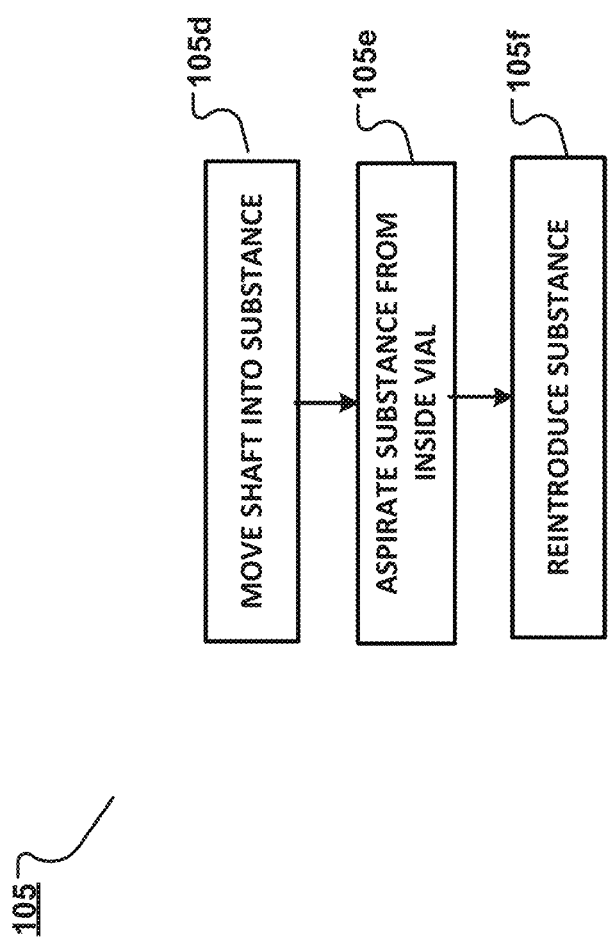
FIG. 13 is a flowchart showing an example process for mixing substances in a vial using the aspiration and dispensing of the substances themselves as a mixing agent.

In implementations where air is determined not to be the best method of mixing, substances may be mixed by aspirating the mixture from the container to be mixed into a probe and reintroducing the aspirated mixture into the container. Referring to FIGS. 12 and 13, prior to example mixing process 105, probe 44 may have been controlled to aspirate diluent or another substance 100 into its shaft, to cause the shaft to enter the interior of the vial 96 containing reagent 101, and to dispense the diluent or another substance 100 into the vial. To mix the substances in accordance with process 105, the control system may control the shaft 46 to move (105d) into the mixture of substances in the vial so that at least the probe's tip 48 (FIG. 3) is immersed in the substances. The probe is controllable to aspirate (105e) substances for example, the combination of substances contained in the vial from the vial into its shaft and to reintroduce/dispense (105f) the substances from the probe into the vial in order to mix the substances (diluent and the reagent in this example). These operations are represented as an example in FIG. 12 by arrows 107. In this example mixing process, the probe need not be removed from, or need not retract from, the vial in order to implement the mixing. Thus, while at least part of the probe's shaft remains within the vial, the control system controls the probe to dispense the content from the shaft into the vial with a velocity to mix the two substances to a level, obtained by previous experimentation, so that the analytical performance of the homogenized substances is equivalent to the standard assay, as experimentally assessed). The example mixing procedures—both with air or liquid—have been previously studied and established to produce a mixed substance that yields analytical results comparable to each specific assay. The type(s) of mixing procedures, specific for each substance/assay are written in the specific preparation procedure software for each substance/assay that is executed by the control system.

The turbulence in the vial resulting from reintroduction of content into the mixture of substances causes the mixing/homogenization. Operations 105e and 105f may be repeated a number of times in order to achieve a level of mixing such way that the analytical performance of the homogenized substances is equivalent to the standard assay, as experimentally assessed). The number of times the process is to be repeated, including as many times as needed, may be programmed into the control system and is based, at least in part, on the content and physical attributes of the substances, such as whether the substances are liquid or solid, their viscosities, and so forth and experimentally assessed in previous studies. The length of time for mixing may be programmed by each substance/assay specific procedure software that is executed by the control system.

In accordance with the above technique, substances may be aspirated into the shaft from the vial from any location (height level) within the vial. For example, referring to FIG. 12, the content may be aspirated from a surface layer 110, from a middle layer 111, or from a layer that is at or near a bottom 112 of vial 96 as shown and dispensed into different layers as experimentally assessed in previous studies. By aspirating substance from at or near a bottom 112 of the vial, the probe may better be able to capture sediment or other substance components that have separated and settled to the bottom of the vial. Such substance components may be aspirated into the shaft and reintroduced into the vial as described previously.

One or both of the foregoing mixing techniques may be used to periodically rem ix content within a vial. For example, mixture components in a vial may separate and settle over time. The probe may be controlled, for example based on a time schedule set by the control system, to repeat the mixing operations as needed to combat settling. The frequency of repetition may be programmed in the software for each specific substance/assay that is executed by the control system.

As described previously, the probe may be used to aspirate air from a vial (or other container) and/or to dispense/inject air into the vial (or other container) in order to adjust an internal pressure of the vial toward a target pressure—for example, to bring or to move the internal pressure closer to the target pressure. In this regard, during mixing, the internal pressure in some vials may increase above a target pressure. Accordingly, probe 44 or another probe may be controlled by the control system to change the pressure in a vial (or other container) containing the mixture in the manner described herein.

The control system described herein may be implemented using computing systems or any other computing device. The control system can be implemented, at least in part, using one or more computer program products, e.g., one or more computer program tangibly embodied in one or more information carriers, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the control system can be performed by one or more programmable processors executing one or more computer programs to perform the functions described herein. All or part of the control system can be implemented using special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random-access storage area or both. Elements of a computer (including a server) include one or more processors for executing instructions and one or more storage area devices for storing instructions and data Generally, a computer will also include, or be operatively coupled to receive data from, or transfer data to, or both, one or more machine-readable storage media, such as mass storage devices for storing data, e.g., magnetic, magneto-optical disks, or optical disks. Machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

Elements of different implementations described herein may be combined to form other embodiments not specifically set forth above. Elements may be left out of the structures described herein without adversely affecting their operation. Furthermore, various separate elements may be combined into one or more individual elements to perform the functions described herein.

What is claimed is:

1. A non-transitory machine-readable medium storing instructions that are executable by one or more processing devices to perform operations comprising:
controlling a probe to aspirate air into a shaft of the probe; and
controlling the probe to dispense air from the shaft into a container to mix at least a first substance and a second substance;
wherein the instructions that are executable are specific to substances being mixed, the substances being mixed including the first substance and the second substance, and wherein the instructions that are executable are specific to an assay to be performed using the first substance and the second substance; and
wherein the operations comprise, prior to aspirating the air, controlling the probe to aspirate the second substance into the shaft, to cause the shaft to enter the container containing the first substance, and to dispense the second substance into the container.

2. The non-transitory machine-readable medium of claim 1, wherein the container comprises a vial, the first substance comprises a reagent in a liquid or dried/lyophilized form, and the second substance comprises a diluent; and
wherein dispensing the air from the shaft produces a mixture in the vial that is based on the diluent and the reagent and that is homogenized.

3. The non-transitory machine-readable medium of claim 1, wherein the container holds one or more additional substances in addition to the first substance and the second substance; and
wherein the one or more additional substances are mixed with the first substance and the second substance.

4. The non-transitory machine-readable medium of claim 1, wherein (i) the air is aspirated by the probe from inside the container, or (ii) the air is aspirated by the probe from outside the container and the shaft is controlled to enter the container to dispense the air.

5. The non-transitory machine-readable medium of claim 1, wherein the air dispensed into the container homogenizes a mixture comprised of the first substance and the second substance.

6. A system comprising:
the non-transitory machine-readable medium of claim 1; and
wherein the probe comprises:
the shaft to hold a substance, the substance comprising the first substance or the second substance; and
a hydraulic line comprising hydraulic fluid to create negative or positive pressure in the shaft to aspirate or to dispense the substance, respectively;
wherein the probe is configured to aspirate air prior to aspirating the substance, thereby creating an air gap in the shaft between the hydraulic fluid and the substance; and
wherein after aspirating the air, the probe is configured to aspirate the substance and air alternately, thereby creating at least one additional air gap between sections of the substance contained in the shaft in addition to the air gap between the hydraulic fluid and the substance.

7. The system of claim 6, wherein the at least one additional air gap between sections of the substance comprises at least two air gaps, each of the at least two air gaps being between two sections of substance.

8. The system of claim 7, wherein there are between three and five air gaps in the shaft.

9. A method comprising:
controlling a probe to aspirate air into a shaft of the probe, the probe comprising a robotic probe that is machine-controllable; and
controlling the probe to dispense air from the shaft into a container to mix at least a first substance and a second substance in the container;
wherein controlling the probe to dispense air from the shaft into the container is performed using a control system to receive an input and to execute, based on the input, a computer program that is specific to substances being mixed, the substances being mixed including the first substance and the second substance, and wherein the instructions that are executable are specific to an assay to be performed using the first substance and the second substance; and wherein prior to aspirating the air, the probe is controlled to aspirate the second substance into the shaft, to cause the shaft to enter the container containing the first substance, and to dispense the second substance into the container.

10. The method of claim 9, wherein the container comprises a vial, the first substance comprises a reagent in a liquid or dried/lyophilized form, and the second substance comprises a diluent; and wherein dispensing the air from the shaft produces mixture in the vial that is based on the diluent and the reagent and that is homogenized.

11. The method of claim 9, wherein the container holds one or more additional substances in addition to the first substance and the second substance; and wherein the one or more additional substances are mixed with the first substance and the second substance.

12. The method of claim 9, wherein (i) the air is aspirated by the probe from inside the container, or (ii) the air is aspirated by the probe from outside the container and the shaft is controlled to enter the container to dispense the air.

13. The method of claim 9, wherein the air dispensed by the probe into the container homogenizes a mixture of the first substance and the second substance.

14. The method of claim 9, further comprising:
controlling a volume and flow rate of the air to be aspirated and/or a depth of the probe inside a liquid in the container to dispense the air.

15. The method of claim 9, wherein the computer program that is specific to the first substance and the second substance comprises executable instructions to determine whether to implement mixing of at least the first substance and the second substance based on whether the mixing will produce air bubbles.

16. The method of claim 9, further comprising:
controlling the probe to aspirate a substance from the container and to reintroduce aspirated substance into the container.

17. The method of claim 16, wherein controlling the probe to aspirate the substance from the container includes aspirating the substance from a layer of material that is at or near a bottom of the container.

18. The method of claim 9, wherein, when controlling the probe to dispense air from the shaft into the container to mix at least the first substance and the second substance, a tip of the probe is immersed in at least one of the first substance or the second substance.

* * * * *